US010100183B2

(12) United States Patent
MacDonald et al.

(10) Patent No.: US 10,100,183 B2
(45) Date of Patent: *Oct. 16, 2018

(54) PROPYLENE POLYMERS

(71) Applicant: ExxonMobil Chemical Patents Inc., Baytown, TX (US)

(72) Inventors: Jeanne M. MacDonald, Sugar Land, TX (US); Antonios Doufas, Baytown, TX (US); Jerome Sarrazin, Sint-Stevens Woluwe (BE); William M. Ferry, Houston, TX (US); Charles J. Ruff, Houston, TX (US); Rahul R. Kulkarni, Maharashtra (IN); Derek W. Thurman, Friendswood, TX (US); Cynthia A. Mitchell, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 223 days.

This patent is subject to a terminal disclaimer.

(21) Appl. No.: 14/437,868

(22) PCT Filed: Nov. 25, 2013

(86) PCT No.: PCT/US2013/071577
§ 371 (c)(1),
(2) Date: Apr. 23, 2015

(87) PCT Pub. No.: WO2014/088857
PCT Pub. Date: Jun. 12, 2014

(65) Prior Publication Data
US 2015/0274907 A1 Oct. 1, 2015

Related U.S. Application Data

(60) Provisional application No. 61/732,451, filed on Dec. 3, 2012.

(30) Foreign Application Priority Data

Mar. 25, 2013 (EP) ..................................... 13160927

(51) Int. Cl.
*C08L 23/12* (2006.01)
*C08J 5/18* (2006.01)
*D01F 6/06* (2006.01)

(52) U.S. Cl.
CPC ................. *C08L 23/12* (2013.01); *C08J 5/18* (2013.01); *C08J 2323/08* (2013.01); *C08J 2323/12* (2013.01); *C08J 2423/14* (2013.01); *C08L 2205/025* (2013.01); *D01F 6/06* (2013.01); *Y10T 428/31938* (2015.04)

(58) Field of Classification Search
CPC ....................................................... C08L 23/12
See application file for complete search history.

(56) References Cited

U.S. PATENT DOCUMENTS

| | | |
|---|---|---|
| 5,723,217 A | 3/1998 | Stahl et al. |
| 5,726,103 A | 3/1998 | Stahl et al. |
| 6,218,011 B1 | 4/2001 | Raetzch et al. |
| 6,416,699 B1 | 7/2002 | Gownder et al. |
| 6,476,135 B1 | 11/2002 | Bugada et al. |
| 6,537,473 B2 | 3/2003 | Raetzch et al. |
| 6,583,076 B1 | 6/2003 | Pekrul et al. |
| 6,710,134 B2 | 3/2004 | Demain |
| 6,723,795 B1 | 4/2004 | Dupire et al. |
| 7,105,603 B2 | 9/2006 | Dharmarajan et al. |
| 7,781,527 B2 | 8/2010 | Autran et al. |
| 9,322,114 B2 | 4/2016 | MacDonald et al. |
| 2004/0122191 A1 | 6/2004 | Arjunan et al. |
| 2006/0057374 A1 | 3/2006 | Sartori et al. |
| 2006/0241254 A1 | 10/2006 | Razavi |
| 2008/0160862 A1 | 7/2008 | Sartori et al. |
| 2008/0172840 A1 | 7/2008 | Kacker et al. |
| 2008/0182940 A1 | 7/2008 | Dharmarajan et al. |
| 2008/0214767 A1 | 9/2008 | Mehta et al. |

(Continued)

FOREIGN PATENT DOCUMENTS

| | | |
|---|---|---|
| EP | 0 632 147 | 1/1995 |
| EP | 1 711 557 | 10/2006 |

(Continued)

OTHER PUBLICATIONS

Berzin et al., "Rheological Behavior of Controlled-Rheology Polypropylenes Obtained by Peroxide-Promoted Degradation During Extrusion: Comparison Between Homopolymer and Copolymer", *Journal of Applied Polymer Science*, 2001, vol. 80, pp. 1243-1252.

Bond et al., "Melt Spinning of Metallocene Catalyzed Polypropylenes. I. On-Line Measurements and Their Interpretation", *Journal of Applied Polymer Science*, 2001, vol. 82, pp. 3223-3236.

Lu et al., "The Influence of Resin Characteristics on the High Speed Melt Spinning of Isotactic Polypropylene. I. Effect of Molecular Weight and Its Distribution on Structure and Mechanical Properties of As-Spun Filaments", *Journal of Applied Polymer Science*, 1987, vol. 34, pp. 1521-1539.

(Continued)

*Primary Examiner* — Margaret G Moore
(74) *Attorney, Agent, or Firm* — Kevin M. Faulkner

(57) ABSTRACT

This invention relates in one aspect to propylene polymers comprising propylene, said polymers having a melt flow rate (MFR, ASTM 1238, 230° C., 2.16 kg) of 10 dg/min to 25 dg/min; a Dimensionless Stress Ratio/Loss Tangent Index $R_2$ at 190° C. from 1.5 to 28; an average meso run length determined by $^{13}C$ NMR of at least 70 or higher; and an MFR MFR Ratio of at least 1.0 and optionally, a Loss Tangent, tan δ, at an angular frequency of 0.1 rad/s at 190° C. from 14 to 100. The inventive propylene polymer compositions are useful in in molded articles and non-woven fibers and fabrics.

24 Claims, 2 Drawing Sheets

(56) References Cited

U.S. PATENT DOCUMENTS

| | | |
|---|---|---|
| 2009/0022956 A1 | 1/2009 | Hisamoto et al. |
| 2009/0098786 A1 | 4/2009 | Tajima et al. |
| 2009/0182105 A1* | 7/2009 | Stadlbauer ............... C08J 5/18 526/126 |
| 2009/0306271 A1* | 12/2009 | Ommundsen ............. C08J 5/18 524/439 |
| 2010/0105274 A1 | 4/2010 | Haubruge et al. |
| 2010/0113718 A1 | 5/2010 | Mehta et al. |
| 2010/0228214 A1 | 9/2010 | Bornemann et al. |
| 2010/0233927 A1 | 9/2010 | Standaert et al. |
| 2010/0233928 A1 | 9/2010 | Ferry et al. |
| 2011/0052929 A1* | 3/2011 | Nairn ................. B29C 47/0021 428/516 |
| 2011/0059668 A1 | 3/2011 | Bieser et al. |
| 2011/0081817 A1 | 4/2011 | Bieser et al. |
| 2011/0086568 A1 | 4/2011 | Standaert et al. |
| 2011/0184136 A1 | 7/2011 | Haubruge et al. |
| 2011/0189917 A1 | 8/2011 | Masuda et al. |
| 2011/0253152 A1 | 10/2011 | Lin et al. |
| 2011/0281963 A1 | 11/2011 | Yoshida et al. |
| 2012/0052273 A1* | 3/2012 | Arroyo Villan ........ B32B 27/32 428/213 |
| 2012/0116338 A1 | 5/2012 | Ferry et al. |
| 2012/0296044 A1* | 11/2012 | Li ............................. C08J 5/18 525/190 |

FOREIGN PATENT DOCUMENTS

| | | |
|---|---|---|
| EP | 2 096 197 | 9/2009 |
| EP | 2 103 634 | 9/2009 |
| EP | 2 126 168 | 12/2009 |
| EP | 2 325 248 | 5/2011 |
| JP | 2007-023398 A | 2/2007 |
| WO | 2001/094462 | 12/2001 |
| WO | 2002/04557 | 1/2002 |
| WO | 2005/111282 | 11/2005 |
| WO | 2006/044083 | 4/2006 |
| WO | 2006/118794 | 11/2006 |
| WO | 2007/024447 | 3/2007 |
| WO | 2009/103810 | 8/2009 |
| WO | 2009/123663 A | 10/2009 |
| WO | 2010/053644 A | 5/2010 |
| WO | 2010/087921 | 8/2010 |

OTHER PUBLICATIONS

Lu et al., "The Influence of Resin Characteristics on the High Speed Melt Spinning of Isotactic Polypropylene. II. On-Line Studies of Diameter, Birefringence, and Temperature Profiles", *Journal of Applied Polymer Science*, 1987, vol. 34, pp. 1541-1556.

Lu et al., "The Role of Crystallization Kinetics in the Development of the Structure and Properties of Polypropylene Filaments", *Journal of Applied Polymer Science*, 1993, vol. 49, pp. 623-631.

Spruiell et al., "The Influence of Isotacticity, Ethylene Comonomer Content, and Nucleating Agent Additions on the Structure and Properties of Melt-Spun Isotactic Polypropylene Filaments", *Journal of Applied Polymer Science*, 1996, vol. 62, pp. 1965-1975.

* cited by examiner

PROPYLENE POLYMERS

CROSS-REFERENCE OF RELATED APPLICATIONS

This application is a National Stage Application of International Application No. PCT/US2013/062574, filed Sep. 30, 2013, which claims the benefit of Ser. No. 61/729,061, filed Nov. 21, 2012, and EP Patent Application No. 13152304.5, filed on Jan. 23, 2013, the disclosures of which are incorporated by reference in their entireties.

FIELD OF THE INVENTION

This invention relates to propylene polymers having an advantageous combination of melt rheological and tacticity properties useful in extruded applications, such as molded parts, films, fibers, and fabrics.

BACKGROUND OF THE INVENTION

Polypropylene is conventionally used to produce fibers and spunbond nonwovens for a wide range of articles, such as, for example, disposable hygiene goods including diapers, sanitary napkins, training pants, adult incontinence products, hospital gowns, baby wipes, moist towelettes, cleaner cloths, and the like. The typical polypropylene nonwoven fabric can mimic the appearance, texture, and strength of a woven fabric. In combination with other materials, they provide a spectrum of products with diverse properties and are also used alone or as components of apparel, home furnishings, health care, engineering, industrial, and consumer goods. Conventionally, propylene based materials, such as, polypropylene that present excellent spinability (e.g., stable fabrication without breaks of thin fibers on the order of 0.7 to 2 denier and particularly 1 to 1.5 denier) suffer from poor fiber and/or fabric properties (e.g., low tensile strength/tenacity). Inversely, polypropylene compositions that exhibit acceptable fiber/fabric properties, such as, good tensile strength, have poor processability associated with fiber breaks and drips in the spinline, particularly when thin fibers are made (e.g., <20 microns or equivalently <2 denier). Thus, there is a general interest to impart superior tensile strength in both machine direction (MD) and transverse direction (TD, also referred to as Cross Direction, CD) of polypropylene nonwoven fabrics, while exhibiting excellent processability and spinability, particularly for applications requiring improved mechanical strength such as disposable hygiene articles.

Likewise, in general, at low fabric basis weights (e.g., <15 g/m$^2$), high line speeds (e.g., >600 m/min) and high throughput rates, conventional polypropylene resins do not provide the desired fabric strength properties. Thus, it is desirable to develop a propylene based resin that exhibits high fabric strength at low fabric basis weights and high line speeds. This allows the fabric converter to downgauge the spunbonding process utilizing less polypropylene resin (lower basis weight fabric) without sacrificing fabric mechanical properties. When used to prepare low basis weight (less than 15 g/m$^2$) spunbond fabrics at high line speeds (such as 9000 m/min or more), typical polypropylene resins tend to show specific tensile strengths (tensile strength in N per 5 cm fabric width divided by fabric basis weight) of roughly 1 N/5 cm/gsm or less (where gsm is g/m$^2$ in the transverse (cross) direction when run in a three beam spunbonding configuration).

Additional references of interest include: U.S. Pat. No. 7,105,603; U.S. Pat. No. 6,583,076; U.S. Pat. No. 5,723,217; U.S. Pat. No. 5,726,103; US 2010/233927; US 2010/0228214; 2011/059668; US 2011/081817; US 2012/0116338; US 2010/0233928; US 2008/0182940; US 2008/0172840; US 2009/0022956; WO 2010/087921; WO 2006/044083; WO 2006/118794; WO 2007/024447; WO 2005/111282; WO 2001/94462; JP 2007-023398 A (Japan Polychem Corp., Feb. 1, 2007); and 80(8) JOURNAL OF APPLIED POLYMER SCIENCE 1243-1252 (John Wiley and Sons Inc., New York, May, 2001).

SUMMARY OF THE INVENTION

The invention is directed to a propylene polymer composition made preferably with a non-metallocene catalyst, but in some embodiments with other types of catalysts, comprising at least 90 wt % propylene, said polymer composition having a melt flow rate (MFR, ASTM 1238, 230° C., 2.16 kg) of 10 dg/min to 25 dg/min; a Dimensionless Stress Ratio/Loss Tangent Index $R_2$ at 190° C. from 1.5 or 2.0; and an average meso run length determined by $^{13}$C NMR of at least 70, or having a percentage molar meso pentads (mmmm) content of greater than 0.935; and wherein the composition has a MFR Ratio of at least 1.0 or 1.5 or or 3.0 or 4.0. The inventive propylene polymer compositions are desirable in molded articles and other articles such as fibers and fabrics.

DETAILED DESCRIPTION

Figure 1:
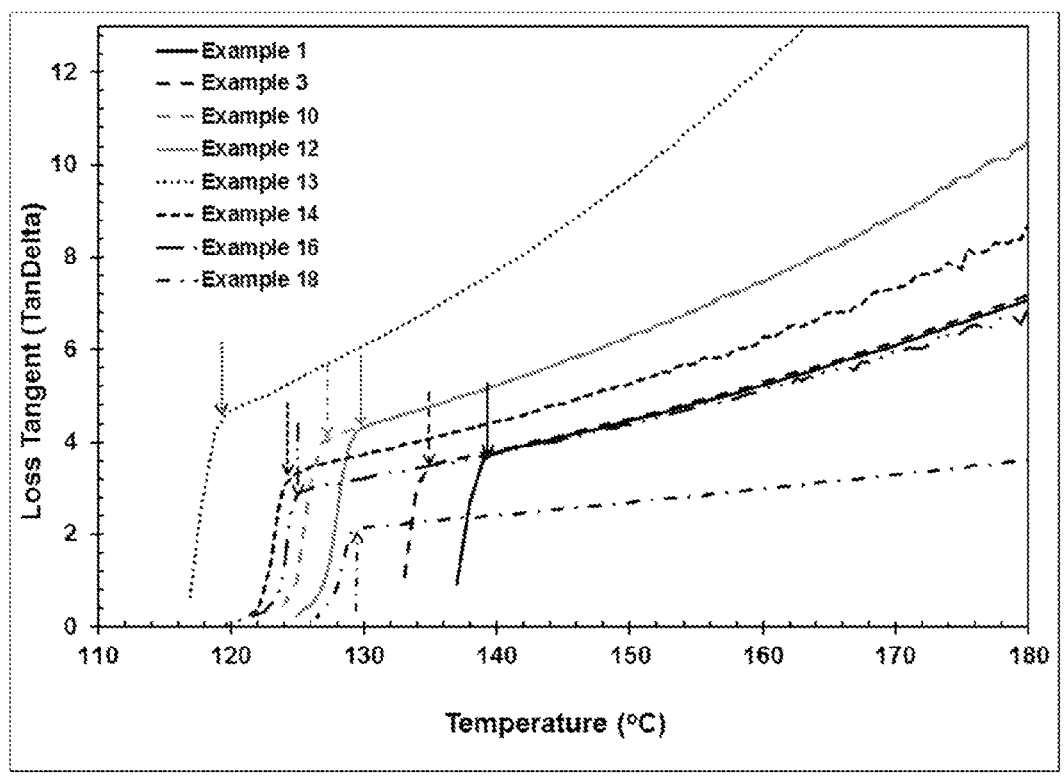
FIG. 1 depicts the evolution of the Loss Tangent (tan δ) under a cooling SAOS rheological experiment.

The inventors have surprisingly discovered propylene based compositions characterized by a unique combination of specific melt rheological, tacticity molecular parameters resulting in a superior combination of spinability and fiber/fabric tensile properties. In addition, the inventive compositions desirably have distinct rheological (including melt elasticity), shear thinning and chain tacticity characteristics. Contrary to previous polypropylenes, the compositions of the present invention do not require lower molecular weight and/or narrow molecular weight distributions (Mw/Mn) to achieve enhanced spinability and fiber properties. Therefore, the inventive compositions do not have to be made with metallocene catalysts to obtain narrow Mw/Mn. The inventive compositions are particularly useful for formation of spunbonded fabrics, melt blown fabrics, combinations of spunbonded and melt blown fabric structures as well as partially oriented yarns, fully oriented yarns, and staple fibers. The inventive compositions are also advantageous in the production of molded parts with high flexural modulus, high tensile strength at yield, and high heat distortion temperature.

In a preferred embodiment of the invention, the propylene polymers to be formed into fibers and/or nonwovens are produced by visbreaking a propylene polymer, typically by visbreaking a propylene polymer having an MFR within a range from 0.1 to 8 dg/min (preferably 0.6 to 6 dg/min, preferably 0.8 to 3 dg/min).

In a preferred embodiment of the invention, the composition comprises a visbroken (controlled rheology) propylene polymer or a reactor grade propylene polymer (i.e., a propylene polymer that has not been treated to visbreaking) or combinations thereof. In the case of a visbroken propylene composition, the initial polymer before the visbreaking step will be referred to as the "base" or "reactor-grade" polymer. The visbroken polymer or reactor-grade polymer (that was not visbroken prior to conversion) can be transformed into useful articles including, but not limited to, fibers, fabrics, webs, molded parts, etc.

Definitions

An "olefin" is a linear, branched, or cyclic compound of carbon and hydrogen having at least one double bond. For purposes of this specification and the claims appended thereto, when a polymer or copolymer is referred to as comprising an olefin, including, but not limited to ethylene, propylene, and butene, the olefin present in such polymer or copolymer is the polymerized form of the olefin. For example, when a copolymer is said to have a "propylene" content of 35 wt % to 55 wt %, it is understood that the mer unit in the copolymer is derived from propylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. The term "different" as used to refer to mer units indicates that the mer units differ from each other by at least one atom or are different isomerically. Accordingly, the definition of copolymer, as used herein, includes terpolymers and the like. A "propylene polymer," also referred to as "polypropylene," is a polymer comprising 90 or 95 or 98 wt % or more units derived from propylene, or is preferably a propylene homopolymer meaning that it contains no more than 0.01 or 0.001 wt % of units derived from any monomer other than propylene.

As used herein, the new notation for the Periodic Table Groups is used as described in *Chemical and Engineering News*, 63(5), 27 (1985).

The terms "catalyst" and "catalyst compound" are defined to mean a compound capable of initiating catalysis. In the description herein, the catalyst may be described as a catalyst precursor, a pre-catalyst compound, or a transition metal compound, and these terms are used interchangeably.

As used herein, a "Ziegler-Natta" catalyst is defined as a transition metal compound bearing a metal-carbon bond—excluding cyclopentadienyls or ligands isolobal to cyclopentadienyl—and able to carry out a repeated insertion of olefin units. Definitions and examples of Ziegler-Natta catalyst used for propylene polymers can be found in Chapter 2 of "Polypropylene Handbook" by Nello Pasquini, $2^{nd}$ Edition, Carl Hansen Verlag, Munich 2005. Examples of Ziegler-Natta catalysts include first and second generation $TiCl_2$ based, the $MgCl_2$ supported catalysts etc. as described in the "Polypropylene Handbook" by N. Pasquini, or in US 2003/0088022 A1 or in U.S. Pat. No. 7,807,769.

As used herein, "metallocene catalyst" means a Group 4 or 5 transition metal compound having at least one cyclopentadienyl, indenyl or fluorenyl group attached thereto, or ligand isolobal to those ligands, that is capable of initiating olefin catalysis, typically in combination with an activator. Definitions and examples of metallocene catalysts can be found in Chapter 2 of "Polypropylene Handbook" by Nello Pasquini, $2^{nd}$ Edition, Carl Hansen Verlag, Munich 2005.

As used herein, "single-site catalyst" means a Group 4 through 10 transition metal compound that is not a "metallocene catalyst" and capable of initiating olefin catalysis, such as Diimine-ligated Ni and Pd complexes; Pyridinediimine-ligated Fe complexes; Pyridylamine-ligated Hf complexes; Bis(phenoxyimine)-ligated Ti, Zr, and Hf complexes. Other examples of single-site catalysts are described in G. H. Hlatky "Heterogenous Single-Site Catalysts for Olefin Polymerization," 100 CHEM. REV. 1347-1376 (2000) and K. Press, A. Cohen, I. Goldberg, V. Venditto, M. Mazzeo, M. Kol, "Salalen Titanium Complexes in the Highly Isospecific Polymerization of 1-Hexene and Propylene," in 50 ANGEW. CHEM. INT. ED. 3529-3532 (2011) and references therein. Examples of single-site catalysts include complexes containing tert-butyl-substituted phenolates ($[Lig_{1-3}TiBn_2]$), complex $[Lig_4TiBn_2]$ featuring the bulky adamantyl group, the sterically unhindered complex $[Lig_5TiBn_2]$.

As used herein, a "non-metallocene" catalyst is any catalyst that is not metallocene based. A "Ziegler-Natta" and "single-site catalysts" are examples of "non-metallocene" catalysts in this invention.

As used herein, "reactor-grade polymer" means a polymer that has been produced by catalytic formation of carbon-carbon bonds between olefins to form a polymer having a certain molecular weight profile (Mw, Mn, and Mz) and not otherwise treated in any other way to effect its average molecular weight profile. As used herein, "visbroken" (or "controlled rheology") means that the polymer has been thermally or chemically treated to break one or more carbon-carbon bonds in the polymer to create shorter chain lengths and alter its molecular weight profile, most preferably lowering Mw, such treatment preferably effected by treatment of the polymer with a chain scission agent well known in the art such as a peroxide, typically under mild heating and shear conditions such as in a twin or single screw extruder.

Propylene Polymers Useful for Visbreaking

In a preferred embodiment of the invention, the inventive propylene polymer composition is produced by visbreaking a base (or "reactor-grade") propylene polymer having an MFR of about 0.1 to about 8 dg/min. Base propylene polymers useful herein to produce the visbroken polymers include polypropylene homopolymers, polypropylene copolymers, and blends thereof. The homopolymer may be isotactic polypropylene, syndiotactic polypropylene, or blends thereof (including blends with atactic polypropylene). The copolymer can be a random copolymer, a statistical copolymer, a block copolymer, or blends thereof. The method of making the base propylene polymer is not critical, as it can be made by slurry, solution, gas phase, a supercritical polymerization process as the one described in U.S. Pat. No. 7,807,769, a super-solution homogeneous polymerization process as the one described in US 2010/0113718, or other suitable processes, and by using catalyst systems appropriate for the polymerization of polyolefins, such as Ziegler-Natta catalysts, and other appropriate catalyst systems, or combinations thereof.

Preferably, the base propylene polymer is a unimodal reactor grade, a bimodal reactor grade, an in-reactor blend, or an extruder blend of two or more propylene polymers (for example, a blend of MFR's of 0.8 dg/min and 2 dg/min), most preferably a unimodal reactor grade. The base polymer may have a unimodal, bimodal, or multimodal molecular weight distribution (Mw/Mn) distribution of polymer species as determined by GPC. By bimodal or multimodal is meant that the GPC-SEC trace has more than one peak or inflection point. An inflection point is that point where the second derivative of the curve changes in sign (e.g., from negative to positive or vice versus). Typically, the base polymer is visbroken to a final MFR preferably in the range of 10 to 25 dg/min, more preferably 14 to 19 dg/min. In another embodiment of the invention, the base polymer may not require peroxide cracking for increase of the MFR, as long as the in-reactor base polymer has desirable MFR (e.g., in the range of 10 to 25 dg/min and rheological characteristics). The inventive composition could also be an extruder blend of two or more propylene polymers with or without peroxide cracking step, as long as combination of the key melt rheological parameters, crystallization and tacticity attributes are satisfied.

Preferred reactor-grade propylene polymers useful to make the visbroken polymer of this invention typically have:
1. an Mw of 240,000 to 2,000,000 g/mol preferably 265,000 to 800,000, more preferably 300,0000 to 600,000, as measured by the GPC method described in the Tests Method section; and/or
2. an Mw/Mn of 1 to 25, preferably 1.6 to 15, more preferably 2 to 8, more preferably 3 to 6, as measured by the GPC method described in the Tests Method section; and/or
3. a Tm (second melt, 1° C./min ramp speed, also referred to as "$T_{mp}$") of 100° C. to 200° C., preferably 120° C. to 185° C., preferably 130° C. to 175° C., more preferably 140° C. to 170° C., even more preferably 155° C. to 167° C., as measured by the DSC method described below in the Test Methods; and/or
4. a percent crystallinity (based on the heat of crystallization) of 20% to 80%, preferably 10% to 70%, more preferably 35% to 55%, as measured by the DSC method described below in the Test Methods; and/or
5. a glass transition temperature (Tg) of −50° C. to 120° C., preferably −20° C. to 100° C., more preferably 0° C. to 90° C., as determined by the DSC method described below in the Test Methods; and/or
6. a crystallization temperature (Tc 1° C./min ramp speed, also referred to as "$T_{cp}$") with 0% nucleating agent of 50° C. to 170° C., preferably 100° C. to 150° C., more preferably 110° C. to 145° C., preferably 115° C. to 135° C., as measured by the DSC method described below in the Test Methods; and/or
7. a branching index ($g'_{vis}$) of 0.85 or more, preferably 0.90 or more, preferably 0.95 or more, preferably 0.99 or more, as measured by the GPC method described in the Test Methods section; and/or
8. an MFR (ASTM 1238, 230° C., 2.16 kg) of 0.1 to 8 dg/min, preferably 0.5 to 5 dg/min, more preferably 0.8 to 3 dg/min; and/or
9. at least 10% tacticity (e.g., at least syndiotactic or at least 10% isotactic).

The base propylene homopolymer or propylene copolymer useful in the present invention preferably has some level of isotacticity. Thus, in one embodiment of the invention, isotactic polypropylene is used as the base propylene polymer herein. Similarly, highly isotactic polypropylene may be used in another embodiment as the base polymer. In another embodiment of the invention, the base propylene polymer may have an average meso run length MRL (defined by Eq. (16) below) as determined by $^{13}$C NMR (described in the Test Methods section) of higher than about 50, more preferably higher than about 80, more preferably higher than about 100, more preferably higher than about 105.

In another embodiment of the invention, the reactor-grade propylene polymer useful herein is syndiotactic, preferably highly syndiotactic. As used herein, "syndiotactic" is defined as having at least 10% syndiotactic pentads according to analysis by $^{13}$C NMR. As used herein, "highly syndiotactic" is defined as having at least 60% syndiotactic pentads according to analysis by $^{13}$C NMR.

In another embodiment of the invention, the reactor-grade propylene polymer useful herein may comprise a blend of a tactic polymer (such as isotactic polypropylene or highly isotactic polypropylene) with an atactic propylene polymer. Atactic polypropylene is defined to be less than 10% isotactic or syndiotactic pentads. Useful atactic polypropylenes typically have an Mw of 10,000 up to 1,000,000 g/mol.

Visbreaking/Chain Scission

The terms "visbreaking" and "chain scission" are used interchangeably and are defined as the process of using one or more free radical initiators to increase polymer melt flow rate (MFR). This is described in U.S. Pat. No. 6,747,114. A "free radical initiator" is defined as a molecular fragment having one or more unpaired electrons.

A polymer undergoes chain scission in accordance with this invention when the base polymer, or a blend of polymers, is treated with a free radical initiator, e.g., peroxide, preferably while the polymer is in a melted state, more preferably in a fully melted state. Preferably, the chain scission is controlled. For example, when a free radical initiator is used, free radicals of the polymers being treated are produced by thermal scission of the peroxide. Other sources of free radicals such as diazo compounds, oxygen, or other compounds may also be utilized. In any case, it is contemplated that the free radicals produced from the initiator (e.g., peroxide) abstract the tertiary hydrogen on the propylene residue of the polymer. The resulting free radical disproportionates to two lower molecular weight chains, one with an olefin near the terminus and the other a saturated polymer. This process can continue with the generation of successively lower molecular weight polymers. Thus, under the appropriate conditions, chain scission is initiated to cause controlled degradation of the polymer or polymer blend.

Crosslinking is a competing process that may occur during chain scission. In a crosslinking reaction, the free radicals combine to form branched macromolecules of higher molecular weight. Eventually, this synthesis reaction may lead to vulcanization of the polymer. In copolymers of ethylene and propylene, this balance of crosslinking and degradation is mainly dependent on the composition of the copolymer. Since the degradation reaction is uniquely associated with the propylene residues, lower amounts of propylene in the copolymer tend to favor crosslinking over degradation. However, it should be recognized that the scission and crosslinking reactions are not mutually exclusionary. That is, even during degradation, some amount of branching may occur. In some cases, the branching and scission reactions are random and do not lead to an increase in Mw/Mn. The amount of branching depends on a number of variables, primarily the reaction conditions, and the composition of the polymers and the extent of degradation. Random copolymers having a higher ethylene content should generate a higher level of branching than those with a lower ethylene content. Thus, in certain embodiments of this invention, the rate or extent of degradation is substantially proportional to the relative amounts of propylene and ethylene sites. For example, if too many ethylene sites are present, the use of the peroxide or other free radical initiator may result in crosslinking rather than chain scission, and the material being treated will not degrade to a higher MFR. Thus, an important aspect of certain specific embodiments of this invention relates to the relative amounts of the polymers used in the blend. In blends of the base propylene polymers, these degradation processes occur for both of the polymers independently of each other.

The free-radical initiator, e.g., peroxide, may be added to the polymer while the polymer is in a solid form, e.g., by coating polymer pellets with an initiator, such as peroxide, which may be in powder, liquid, or other form, in which case the polymer is said to be "treated" with the initiator when the initiator becomes active, which usually happens at a temperature higher than melting point of the polymer. Preferably, however, the free-radical initiator is added to the polymer after the polymer has formed, but while the polymer is in a melted condition, e.g., during the post-polymerization processing, such as when a polymer mixture (which may include solvent) is introduced to a devolatilizer or extruder, which typically occurs at an elevated temperature.

The term "melted" refers to the condition of the polymer when any portion of the polymer is melted, and includes fully melted and partially melted. Preferably, the polymer is treated by free-radical initiator while the temperature of the polymer is above its melting point.

Preferably, the visbreaking agent is a peroxide and an organic peroxide in another embodiment, wherein at least a methyl group or higher alkyl or aryl is bound to one or both oxygen atoms of the peroxide. In yet another embodiment, the visbreaking agent is a sterically hindered peroxide, wherein the alkyl or aryl group associated with each oxygen atom is at least a secondary carbon, a tertiary carbon in another embodiment. Non-limiting examples of sterically hindered peroxides ("visbreaking agents") include 2,5-bis (tert-butylperoxy)-2,5-dimethylhexane, 2,5-dimethyl-2,5-bis-(t-butylperoxy)-hexyne-3,4-methyl-4-t-butylperoxy-2-pentanone, 3,6,6,9,9-pentamethyl-3-(ethylacetate)-1,2,4,5-textraoxy cyclononane, α,α'-bis-(tert-butylperoxy) diisopropyl benzene, and mixtures of these and any other secondary- or tertiary-hindered peroxides. A preferred peroxide is 2,5-bis(tert-butylperoxy)-2,5-dimethyl-hexane, also known with the commercial name: Luperox 101 or Trigonox 101. Luperox 101 or Trigonox 101 can be fed in the extruder pure in liquid form or as a masterbatch blend in mineral oil (e.g., 50/50 weight/weight blend of Trigonox 101/mineral oil). Another common peroxide used as a visbreaking agent for polypropylene is di-t-amyl peroxide, most commonly known with the commercial name DTAP. Alternatively, the free radical initiator may include a diazo compound, or any other compound or chemical that promotes free radicals in an amount sufficient to cause degradation as specified herein.

Preferred propylene polymers useful in this invention, include those that have been treated with a visbreaking agent such that its MFR is increased by at least 10%, preferably by at least 50% preferably by at least 100%, preferably by at least 300%, preferably by at least 500%, preferably by at least 650%. In the event the polymer is a blend of different propylene polymers, then an average MFR based on the logarithmic weight blending rule (Robeson, L. M., "Polymer Blends", Chapter 6, p. 368 (Carl Hanser Verlag, Munich 2007)) of the MFRs of the individual blend components is used to determine the MFR of the blend and was found to lead to excellent estimation of the blend MFR of the studied systems. For example, for a two component system, the ln(melt flow rate of the blend)=(weight fraction of component 1×ln(melt flow rate of component 1)+weight fraction of component 2×ln(melt flow rate of component 2).

Inventive Polymer Compositions

The inventive propylene polymer compositions described herein may be made with any olefin polymerization catalyst, but preferably, the inventive propylene polymer compositions are made with a non-metallocene catalyst, most preferably a Ziegler-Natta catalyst. The propylene polymer composition comprises at least 90 or 95 or 98 wt % propylene (most preferably a propylene homopolymer), said polymer composition having a melt flow rate (MFR, ASTM 1238, 230° C., 2.16 kg) of 10 or 14 or 16 or 19 dg/min to 25 dg/min; a Dimensionless Stress Ratio/Loss Tangent Index $R_2$ at 190° C. from 1.5 or 2.0 or 2.5 or 3.0 or 4.0 or 5.0 to 8.0 or 10.0 or 14.0 or 16.0 or 20.0 or 28.0; and an average meso run length determined by $^{13}C$ NMR of at least 70 or higher, or within a range from 70 or 80 to 105 or 110 or 120 or 130 or 150 or 170 or 200 or 250, or having a percentage molar meso pentads (mmmm) content of greater than 0.935. Preferably, the composition has a MFR Ratio of within a range from 1 to 2.4 and/or greater than 4.5 (i.e., within the range from 1 to 2.4 and within the range from 4.5 to 7.0), or at least 1.0 or 1.5 or 3.0 or 4.0 or 4.5 or 6 or 7; or within a range from 1.0 or 1.5 or 3.0 or 4.0 or 4.5 or 6 or 7 to 9 or 10 or 12 or 16 or 20. The methods for testing these and other features are described in detail in the description below. The composition may comprise a combination of two or more propylene polymers, either in-reactor blends or extruder blends or a combination thereof. In any case, whether it is one polymer or multiple polymers, the visbroken propylene polymer composition will have these properties.

The inventive propylene polymer composition preferably has a percentage molar meso pentads (mmmm) content of greater than 0.935 as mentioned above, or a value within a range from 0.900 or 0.910 or 0.910 or 0.930 to 0.950 or 0.960 or 0.980.

The propylene polymer composition may also be described by certain other features. Preferably, the propylene polymer composition has a Loss Tangent, tan δ, at an angular frequency of 0.1 rad/s at 190° C. from 14 or 20 or 30 to 70 or 80 or 90 or 100. The propylene polymer composition may also have a Dimensionless Stress Ratio Index $R_1$ at 190° C. of 1.2 or 1.5 to 4.0 or 4.5 or 5.0. The propylene polymer composition may also have a Dimensionless Stress Ratio Index $R_2$ at 190° C. of 1.5 or 2.0 to 2.5 or 3.5 or 4.5 or 16 or 20 or 28. The propylene polymer composition may also have a Dimensionless Shear Thinning Index $R_3$ at 190° C. of 6 or 8 to 10 or 13 or 15. Also, the propylene polymer composition may also have a Dimensionless Loss Tangent/Elasticity Index $R_4$ at 190° C. of 1.5 or 2.0 or 2.5 to 16 or 20 or 25. Finally, the propylene polymer composition also has a Stress Ratio (SR) at a shear rate of 500 s$^{-1}$ at 190° C. from 3.0 or 3.3 or 3.5 to 4.0 or 5.0 or 6.0.

The propylene polymer compositions described herein may also be described by other melt features. Preferably, the propylene polymer composition has a $T_{mp}$ (second melt, 1° C./min) of 120° C. or more; or $T_{mp}$ is within a range from 140 or 145 or 150° C. to 170 or 175 or 180 or 185° C. Preferably, the propylene polymer composition has a percent crystallinity of 20% to 80%. Preferably the propylene polymer composition also have a glass transition temperature, Tg, of −50° C. to 120° C. And preferably, the propylene polymer composition may also have a branching index ($g'_{vis}$) of 0.85 or more. And preferably, the propylene polymer composition has a $T_{c,rheol}$ of 120° C. or more; or within a range from 120 or 125 or 130° C. to 145 or 150 or 155 or 160° C. Finally, the propylene polymer composition preferably has a $T_{cp}$ (1° C. per minute) of 115° C. or more; or $T_{cp}$ is within a range from 105 or 110° C. to 130 or 135 or 140 or 145 or 150 or 155° C.

The inventive propylene polymer compositions may also have desirable molecular weight profile. Preferably, the propylene polymer composition has an Mw from 190 or 185 kg/mol to 260 kg/mol. The propylene polymer composition also preferably has an Mz from 250 kg/mol to 600 kg/mol. Also, the propylene polymer composition preferably has an Mw/Mn of 1.0 or 2.0 or 2.5 to 4.0 or 5.0 or 6.0 or 7.0, and preferably has an Mz/Mw of 1.5 or 2.0 to 2.5 or 3.5 or 4.5.

The inventors have also found that the propylene polymer composition preferably has a supercooling parameter SCP (1° C. per minute) of −1° C. or less, or within a range from −25 or −20 or −15° C. to −10 or −7 or −4 or −1° C.; and an SCP (10° C. per minute) of 10° C. or less, or within a range from −10 or −8 or −2° C. to 2 or 5 or 10 or 16° C.

The propylene polymer composition also preferably has a 1% secant flexural modulus of 190 kpsi or higher; or within a range from 180 or 190 kpsi to 220 or 280 or 300 or 350 or 400 kpsi. Also, the propylene polymer composition preferably has a heat distortion temperature (HDT) at 66 psi of 95° C. or higher, or within a range from 80 or 85 or 90° C. to 100 or 110 or 115 or 120° C.

In an embodiment, to form the inventive propylene polymer composition, reactor-grade propylene polymer having an MFR of less than 8.0 or 6.0 or 4.0 or 3.0 g/10 min is visbroken while under shear/extensional flow forces and at a melt at a temperature within the range from 190 or 200 or 210° C. to 250 or 260 or 280° C. to form the propylene polymer composition. Preferably, no external nucleator is present in the propylene polymer composition, meaning that no agent such as sodium benzoate is added to the composition.

In another embodiment, the inventive propylene polymer composition comprising at least 90 or 95 or 98 wt % propylene is made from any polyolefin polymerization catalyst in which case said polymer composition will possess an MFR in the range from 10 or 14 or 16 or 19 dg/min to 25 dg/min, and
  a) an average meso run length determined by $^{13}C$ NMR of at least 90 or 92 or higher, or within a range from 92 or 94 to 98 or 100 or 108 or 112; and/or a total number of defects (stereo and regio) per 10,000 monomers of less than 108 or 112, or within a range from 20 or 30 or 40 to 100 or 110 or 120; and/or a percentage molar meso pentads (mmmm) content within a range from 0.935 to 0.980; and/or a number of stereo defects from 44 to 145 and a number of regio defects from 0 to 80; and
  b) at least one of the following:
    1) a Dimensionless Stress Ratio Index $R_1$ at 190° C. from 1.2 to 4.5 or within the stated narrowing ranges above; or
    2) a Dimensionless Stress Ratio/Loss Tangent Index $R_2$ at 190° C. from 1.5 to 28 or within the stated narrowing ranges above; or
    3) a Dimensionless Shear Thinning Index $R_3$ at 190° C. from 6 to 13 or within the stated narrowing ranges above; or
    4) a Dimensionless Loss Tangent/Elasticity Index $R_4$ at 190° C. from 1.5 to 20 or within the stated narrowing ranges above; or
    5) a Loss Tangent (tan δ) at an angular frequency of 0.1 rad/s at 190° C. from 14 to 90 or within the stated narrowing ranges above; or
    6) a Stress Ratio (SR) at a shear rate of 500 $s^{-1}$ at 190° C. from 3.0 to 6.0 or within the stated narrowing ranges above.

If visbroken, this composition has a MFR Ratio of within a range from 1 to 2.4 and/or greater than 4.5, or at least 1.0 or 1.5 or 3.0 or 4.0 or 4.5 or 6 or 7; or within a range from 1.0 or 1.5 or 3.0 or 4.0 or 4.5 or 6 or 7 to 9 or 10 or 12 or 16 or 20. This embodiment of the composition can also be described by narrowing ranges as described above and throughout the description.

In yet another embodiment, the inventive propylene polymer comprising at least 90 or 95 or 98 wt % propylene (most preferably a propylene homopolymer), said polymer composition having:
  a) a melt flow rate (MFR, ASTM 1238, 230° C., 2.16 kg) of 10 or 14 or 16 or 19 dg/min to 25 dg/min;
  b) a Dimensionless Stress Ratio/Loss Tangent Index $R_2$ at 190° C. from 1.5 or 2.0 or 2.5 or 3.0 or 4.0 or 5.0 to 8.0 or 10.0 or 14.0 or 16.0 or 20.0 or 28.0; and
  c) an average meso run length determined by $^{13}C$ NMR of at least 50 or 70 or higher, or within a range from 70 or 80 to 105 or 110 or 120 or 130, and/or a percentage molar meso pentads (mmmm) content of greater than 0.920 or 0.935 or within the stated narrowing ranges above; and/or a number of stereo defects from 44 to 145 and a number of regio defects from 0 to 80; and
  d) a melting peak temperature $T_{mp}$ (10° C./min) from 153 or 155 or 158 or 160 or 165 or 170° C. to 180 or 185 or 190° C.

If visbroken, this composition has a MFR Ratio of within a range from 1 to 2.4 and/or greater than 4.5, or at least 1.0 or 1.5 or 3.0 or 4.0 or 4.5 or 6 or 7; or within a range from 1.0 or 1.5 or 3.0 or 4.0 or 4.5 or 6 or 7 to 9 or 10 or 12 or 16 or 20. This embodiment of the inventive composition can also be described by narrowing ranges as described above and throughout the description.

Additives

A variety of additives may be incorporated into the propylene copolymer compositions described above used to make the fibers and fabric or molded materials for various purposes. Such additives include, for example, stabilizers, antioxidants, fillers, colorants, nucleating agents, and slip additives. Primary and secondary antioxidants include, for example, hindered phenols, hindered amines, and phosphates. Nucleating agents include, for example, sodium benzoate, talc, and other chemicals. Also, other nucleating agents may also be employed such as Ziegler-Natta olefin product or other highly crystalline polymer. Other additives such as dispersing agents, for example, Acrowax C, can also be included. Slip agents include, for example, oleamide, and erucamide. Catalyst deactivators are also commonly used, for example, calcium stearate, hydrotalcite, calcium oxide, acid neutralizers, and other chemicals known in the art.

Other additives may include, for example, fire/flame retardants, plasticizers, curative agents, curative accelerators, cure retarders, processing aids, tackifying resins, and the like. The aforementioned additives may also include fillers and/or reinforcing materials, either added independently or incorporated into an additive. Examples include carbon black, clay, talc, calcium carbonate, mica, silica, silicate, combinations thereof, and the like. Other additives which may be employed to enhance properties include antiblocking agents, lubricants, and nucleating agents. The lists described herein are not intended to be inclusive of all types of additives which may be employed with the present invention. Nucleating agents and fillers tend to improve rigidity of the article which is particularly desired in certain classes of molded parts.

Fiber and Fabric Formation

The formation of nonwoven fabrics from polyolefins and their blends generally requires the manufacture of fibers by extrusion followed by consolidation or bonding. The extrusion process is typically accompanied by mechanical or aerodynamic drawing of the fibers. The fabric of the present invention may be manufactured by any technique known in the art. Such methods and equipment are well known. For example, spunbond nonwoven fabrics may be produced by spunbond nonwoven production lines produced by Reifenhauser GmbH & Co., of Troisdorf, Germany. This utilizes a slot drawing technique as described in U.S. Pat. No. 4,820,142; U.S. Pat. No. 6,918,750; and EP 1 340 843 A1. Additional useful methods include those disclosed in US 2012/0116338 A1 and US 2010/0233928 A1.

The three more conventional fiber types, continuous filament, bulked continuous filament, and staple, and related manufacturing processes to produce them, are contemplated as applications for the fibers of the present invention. For example, the polymer melt is extruded through the holes in the die (spinneret) between, 0.3 mm to 0.8 mm in diameter. Low melt viscosity of the polymer is important and is achieved through the use of high melt temperature (230° C. to 280° C.) and high melt flow rates (e.g., 10 g/10 min to 40 g/10 min) of the polymers used. A relatively large extruder is usually equipped with a manifold to distribute a high output of molten PP to a bank of two to fifty (alternately eight to twenty) spinnerets. Each spinhead is usually equipped with a separate gear pump to regulate output through that spinhead; a filter pack, supported by a "breaker plate;" and the spinneret plate within the head. The number of holes in the spinneret plate determines the number of filaments in a yarn and varies considerably with the different yarn constructions, but it is typically in the range of 40 to 100,000 (alternately 50 to 250). The holes are typically grouped into round, annular, or rectangular patterns to assist in good distribution of the quench air flow.

Continuous filament yarns typically range from 40 denier to 2,000 denier (denier=number of grams/9000 meters). Filaments can range from 1 to 20 denier per filament (dpf) and the range is expanding. Spinning speeds are typically 10 to 10,000 m/min (alternately 800 m/min to 1500 m/min). An exemplary method would proceed as follows. The filaments are drawn at draw ratios of 3:1 or more (one- or two-stage draw) and wound onto a package. Two-stage drawing allows higher draw ratios to be achieved. Winding speeds are of 2,000 m/min or more, alternately 3,500 m/min or more, are useful.

Partially oriented yarn (POY) is the fiber produced directly from fiber spinning without solid state drawing (as continuous filament mentioned above). The orientation of the molecules in the fiber is done only in the melt state after the molten polymer leaves the spinneret. Once the fiber is solidified, little or no drawing of the fiber takes place and the fiber is wounded up into a package. The POY yarn (as opposed to fully oriented yarn, or FOY, which has gone through solid state orientation and has a higher tensile strength and lower elongation) tends to have a higher elongation and lower tenacity.

Bulked Continuous Filament ("CF") fabrication processes fall into two basic types, one-step and two-step. For example, in a two-step process, an undrawn yarn is spun at less than 1,000 m/min (3,300 ft/min), usually 750 m/min, and placed on a package. The yarn is drawn (usually in two stages) and "bulked" on a machine called a texturizer. Winding and drawing speeds are limited by the bulking or texturizing device to 2,500 m/min (8,200 ft/min) or less. A common process today is the one-step spin/draw/text (SDT) process. It is similar to the one-step CF process, except that the bulking device is in-line. Bulk or texture changes yarn appearance, separating filaments, and adding enough gentle bends and folds to make the yarn appear fatter (bulkier).

There are two basic staple fiber fabrication processes: traditional and compact spinning. The traditional process typically involves two steps: 1) producing, applying finish, and winding followed by 2) drawing, a secondary finish application, crimping, and cutting into staple. Filaments can range, for example, from 0.5 dpf to >70 dpf, (dpf=denier per filament) depending on the application. Staple length can be as short as 3 mm or as long as 200 mm (0.25 in. to 8 in.) to suit the application. For many applications, the fibers are crimped. Crimping is accomplished by over-feeding the tow into a steam-heated stuffer box with a pair of nip rolls. The over-feed folds the tow in the box, forming bends or crimps in the filaments. These bends are heat-set by steam injected into the box.

Meltblown fibers are fibers formed by extruding a molten thermoplastic material through a plurality of fine, usually circular, die capillaries as molten threads or filaments into usually converging, usually hot, and high velocity, gas, e.g., air, streams to attenuate the filaments of molten thermoplastic material to form fibers. During the meltblowing process, the diameter of the molten filaments is reduced by the drawing air to a desired size. Thereafter, the meltblown fibers are carried by the high velocity gas stream and are deposited on a collecting surface to form a web of substantially randomly disbursed meltblown fibers. Such a process is disclosed, for example, in U.S. Pat. No. 3,849,241; U.S. Pat. No. 4,526,733; and U.S. Pat. No. 5,160,746. Meltblown fibers may be continuous or discontinuous and are generally smaller than ten microns in average diameter.

A particular embodiment of the present invention involves the use of the invention polymers in the making of spunbonded fabrics. Conventional spunbond processes are illustrated in U.S. Pat. No. 3,825,379; U.S. Pat. No. 4,813,864; U.S. Pat. No. 4,405,297; U.S. Pat. No. 4,208,366; and U.S. Pat. No. 4,334,340. The spunbonding process is one which is well known in the art of fabric production. Generally, continuous fibers are extruded, laid on an endless belt, and then bonded to each other, and often times to a second layer such as a melt blown layer, often by a heated calender roll, or addition of a binder. An overview of spunbonding may be obtained from L. C. Wadsworth and B. C. Goswami, Non-woven Fabrics: "Spunbonded and Melt Blown Processes" proceedings Eight Annual Nonwovens Workshop, Jul. 30-Aug. 3, 1990, sponsored by TANDEC, University of Knoxville, Tenn.

The fibers can be annealed to improve their performance. Annealing is often combined with mechanical orientation. It is preferred to employ an annealing step in the process. Annealing may also be done after fabrication of a nonwoven material from the fibers. Annealing partially relieves the internal stress in the stretched fiber and restores the elastic recovery properties of the blend in the fiber. Annealing has been shown to lead to significant changes in the internal organization of the crystalline structure and the relative ordering of the amorphous and semicrystalline phases. This leads to recovery of the elastic properties. Thermal annealing of the polymer blend is conducted by maintaining the polymer blends or the articles made from such a blend at a temperature between room temperature to a maximum of 160° C. or more, preferably to a maximum of 130° C., for a period between 5 minutes to less than 7 days. A typical annealing period is 3 days at 50° C. or 5 minutes at 100° C. The annealing time and temperature can be adjusted for any particular blend composition by experimentation. While the annealing is done in the absence of mechanical orientation, the latter can be a part of the annealing process on the fiber (past the extrusion operation) required to produce an elastic material. Mechanical orientation can be done by the temporary, forced extension of the polymer fiber for a short period of time before it is allowed to relax in the absence of the extensional forces. Oriented polymer fibers are obtained by maintaining the polymer fibers or the articles made from a blend at an extension of 100% to 700% for a period of 0.1 seconds to 24 hours. A typical orientation is an extension of 200% for a momentary period at room temperature.

In a preferred embodiment, any of the fibers or fabrics (such as nonwoven fabrics) prepared according to this invention have a CD specific tensile strength (determined from the peak load of the force-elongation curve as measured by Worldwide Strategic Partners test 110.4(5) (WSP 110.4 (05)) of at least 1 N/5 cm/gsm, preferably at least 1.1 N/5 cm/gsm, preferably at least 1.2 N/5 cm/gsm, for a fabric basis weight in the range of 8 to 12 gsm produced at a line speed of at least 600 m/min, more preferably at least 700 m/min, and more preferably of at least 800 m/min. CD specific tensile strength (N/5 cm/gsm) is CD strength (N/5 cm) divided by fabric basis weight (gsm) (normalization).

In a preferred embodiment, any fibers or fabrics (such as nonwoven fabrics) prepared according to this invention has a MD specific tensile strength (as measured by WSP 110.4 (05)) of at least 2.7 N/5 cm/gsm, preferably at least 2.9 N/5 cm/gsm, preferably 3.0 N/5 cm/gsm, for a fabric basis weight in the range of 8 to 12 gsm produced at a line speed of at least 600 m/min, more preferably at least 700 m/min, and more preferably of at least 800 m/min. MD specific tensile strength (N/5 cm/gsm) is MD strength (N/5 cm) divided by fabric basis weight (gsm) (normalization).

In a preferred embodiment, any of the fibers or fabrics (such as nonwoven fabrics) prepared according to this invention have a tensile strength anisotropy defined as the ratio of the specific tensile strength in the MD over the CD (as measured by WSP 110.4 (05)) of less than about 2.7, preferably less than about 2.6, preferably less than about 2.6, for a fabric basis weight in the range of 8 to 12 gsm produced at a line speed of at least 600 m/min, more preferably at least 700 m/min, and more preferably of at least 800 m/min.

In a preferred embodiment, any of the fibers or fabrics (such as nonwoven fabrics) prepared according to this invention have a total hand (determined as described in the Test Methods below) of less than about 6.8 gr, preferably less than about 6.6 gr, preferably less than about 6.5 gr, for a fabric basis weight in the range 8 to 12 gsm produced at a line speed of at least 600 m/min, more preferably at least 700 m/min, and more preferably of at least 800 m/min. Preferably, the fabrics made herein have a total hand of less than about 6.8 gr and more preferably less than about 6.5 gr.

In a particularly preferred embodiment, fibers comprising the compositions prepared herein have good spinability (as defined above) in combination with outstanding fabric tensile properties (e.g., CD specific tensile strength) of at least 1.1 N/5 cm/gsm, a MD specific tensile strength of at least 2.7 N/5 cm/gsm, and a total hand of less than about 6.8 gm force or a tensile modulus of less than about 32 N/5 cm/gsm, for a fabric basis weight in the range of 8 to 12 gsm produced at a line speed of at least 600 m/min, more preferably at least 700 m/min, and more preferably of at least 800 m/min.

In a particularly preferred embodiment, fibers comprising the compositions prepared herein have good spinability (as defined above) in combination with a fabric tensile anisotropy (ratio of MD over CD specific tensile strength as determined by WSP 110.4 (05)) of less than about 2.7, for a fabric basis weight in the range of 8 to 12 gsm produced at a line speed of at least 600 m/min, more preferably at least 700 m/min, and more preferably of at least 800 m/min.

In a particularly preferred embodiment, fibers comprising the compositions prepared herein have good spinability (as defined above) in combination with outstanding fabric tensile properties (e.g., CD specific tensile strength) of at least 1.2 N/5 cm/gsm, MD specific tensile strength of at least 2.9 N/5 cm/gsm, and total hand of less than about 6.6 gm force or MD tensile modulus of less than about 30 N, for a fabric basis weight in the range of 8 to 12 gsm produced at a line speed of at least 600 m/min, more preferably at least 700 m/min, and more preferably of at least 800 m/min.

In a particularly preferred embodiment, the compositions prepared herein have excellent spinability (e.g., stable fabrication without breaks) particularly when thin (e.g., less than 18 microns or equivalently less than about 2 denier) fibers are made.

In another preferred embodiment, fibers or fabrics (such as nonwoven fabrics) made using the materials described herein are produced at a line speed of at least 500 m/min (preferably at least 600 m/min, at least 700 m/min, at least 800 m/min, at least 850 m/min, at least 900 m/min).

The fibers and fabrics of the invention have wide applicability spanning several industries. For example, fabrics of the invention may be used in the manufacture of hygiene products. Examples include diapers and feminine hygiene products. The fabrics of the invention are also useful for medical products. Examples include medical fabric for gowns, linens, towels, bandages, instrument wraps, scrubs, masks, head wraps, and drapes. Additionally, the fabrics of the invention are useful in the manufacture of consumer products. Examples include seat covers, domestic linens, tablecloths, and car covers. It is also contemplated that the inventive fabrics may make-up either a portion or a component of the articles described above.

In a preferred embodiment, the compositions of this invention can be used for disposable diaper and napkin chassis construction, including: baby diaper leg elastic, diaper frontal tape, diaper standing leg cuff, diaper chassis construction, diaper core stabilization, diaper liquid transfer layer, diaper outer cover lamination, diaper elastic cuff lamination, feminine napkin core stabilization, and feminine napkin adhesive strip. The diaper may be of various suitable shapes. For example, the diaper may have an overall rectangular shape, T-shape, or an approximately hour-glass shape. Other suitable components which may be incorporated in a diaper comprising the compositions described herein include waist flaps and the like which are generally known to those skilled in the art. Examples of diaper configurations suitable for use in connection with the instant invention which may include other components suitable for use on diapers are described in U.S. Pat. No. 4,798,603; U.S. Pat. No. 5,176,668; U.S. Pat. No. 5,176,672; U.S. Pat. No. 5,192,606; and U.S. Pat. No. 5,509,915.

Due to their unique combinations of rheological, crystallization, and tacticity parameters, the inventive compositions are also surprisingly useful in other applications requiring high melt strength and enhanced flow-induced crystallization kinetics, including, but not limited to, blow molded articles, foams, films (biaxial, blown film, cast film) etc., which provides a combination of improved processability and good balance of mechanical properties (e.g., tensile strength, elongation to break, puncture resistance, impact resistance etc.).

Test Methods

Melt Flow Rate (MFR), defined in grams (g) of polymer per 10 min (g/10 min or its equivalent unit dg/min), was measured according to ASTM D1238 (2.16 kg, 230° C.). In the case of samples in granular or powder form from the polymerization reactor, the samples are first stabilized with 3,5-di-tert-butyl-4-hydroxytoluene (BHT) before measurement of MFR as follows. A solution is prepared by dissolving 40 g of BHT into 4000 ml of hexane. 10 g of powder or granular propylene polymer sample are weighed to be tested into an aluminum-weighing pan. 10 ml of the BHT/hexane solution are added onto the granules in the pan. The sample slurry is placed in an 105° C. vacuum oven for a minimum of 20 min, after which the sample is removed from the oven and placed in a nitrogen purged desiccator for a minimum of 15 minutes allowing the sample to cool. The dry stabilized with BHT sample is measured for MFR according to the procedure described previously.

In case of a thermally or peroxide cracked (visbroken) composition, the melt flow rate (MFR) ratio is defined as the ratio of the final composition MFR over the MFR of the base (reactor) resin before the thermal and/or visbreaking/cracking process. In case the base (reactor) resin is in granular or powder (unstabilized) form, its MFR is measured upon BHT stabilization with the procedure described above. For example, if the MFR of the base resin is 2 dg/min and the final composition MFR (upon peroxide cracking) is 17 dg/min, the MFR ratio is 19/2=9.5. In the case of peroxide cracked (visbroken) composition, the term "MFR cracking or crack ratio" will be used which is equivalent to the MFR ratio as defined above. In the absence of visbreaking or thermal degradation (e.g., non visbroken/reactor composition), the MFR ratio is defined as 1 (MFR remains the same as the composition made in the reactor). Therefore, the term "MFR ratio" as defined herein is general and can be used to cover all types of compositions in this invention, either made with a thermal or peroxide visbreaking step after the reactor polymerization or without a visbreaking step. Any deviation of the MFR ratio from a value 1 1 (preferably >1). implies a thermal or visbreaking treatment step of the composition.

case of a thermally or peroxide cracked (visbroken) composition where the base resin is a blend of different propylene polymers, then an average MFR of the base resin is defined on the basis of the logarithmic weight blending rule (Robeson, L. M., "Polymer Blends", Chapter 6, p. 368 (Carl Hanser Verlag, Munich 2007)) of the MFRs of the individual blend components and was found to lead to excellent estimation of the blend MFR of the studied systems. For example, for a two component system comprising the base propylene polymer resin, ln(melt flow rate of the blend)=(weight fraction of component 1×ln(melt flow rate of component 1)+weight fraction of component 2×ln(melt flow rate of component 2). If the blended base resin is subsequently thermally or peroxide cracked (visbroken), the MFR ratio is defined as the ratio of the final composition MFR after visbreaking over the average MFR of the base resin. For example, for a 25/75 weight/weight blend of two propylene polymers of MFR 0.8 and 2 dg/min, respectively, the average MFR of the base resin is defined/calculated from the logarithmic weight blending rule as 1.60 dg/min. If the 25/75 blend is peroxide cracked to 16 dg/min, the MFR ratio of the composition is 16/1.6=10

In case the composition comprises a blend of propylene polymers that include at least one component that is thermally or peroxide cracked (visbroken), the MFR MFR Ratio of the composition is defined as the highest MFR MFR Ratio of an individual blending component.

Small Angle Oscillatory Shear (SAOS) Frequency Sweep Melt Rheology.

Testing was performed at 190° C. using a 25 mm cone (1°) and plate configuration on an MCR301 controlled strain/stress rheometer (Anton Paar GmbH). Sample test disks (25 mm diameter, 1 mm thickness) were prepared via compression molding of pellet samples at 190° C. using a Schwabenthan laboratory press (200T). Typical cycle for sample preparation is 1 minute without pressure followed by 1.5 minute under pressure (50 bars) and then cooling during 5 minutes between water cooled plates. The sample was first equilibrated at 190° C. for 13 min to erase any prior thermal and crystallization history. An angular frequency sweep was next performed from 500 rad/s to 0.0232 rad/s using 6 points/decade and a strain value of 10% lying in the linear viscoelastic region defined and calculated from strain sweep experiments. All experiments were performed in a nitrogen atmosphere to minimize any degradation of the sample during rheological testing.

For purposes of this invention and the claims thereto, the zero-shear-rate viscosity, $\eta_O$, is defined from the frequency dependent storage (G') and loss (G") dynamic moduli and a discrete relaxation spectrum method based on a linear regression (as discussed in R. B. Bird, C. F. Curtiss, R. C. Armstrong, and O. Hassager, 1 DYNAMICS OF POLYMERIC LIQUIDS, (Wiley, New York, $2^{nd}$ ed., 1987), and A. K. Doufas, L. Rice, W. Thurston, "Shear and Extensional Rheology of Polypropylene Melts: Experimental and Modeling Studies," 55 J. RHEOLOGY 95-126 (2011)) as follows:

$$\eta_o = \sum_{j=1}^{M} \lambda_j G_j \quad (1)$$

where M is the number of discrete relaxation modes that depend on the range of experimental angular frequencies as outlined in Bird et al., (1987), $\lambda_j$ is a discrete relaxation time of the discrete spectrum and $G_j$ is the corresponding shear modulus.

In case of compositions where the terminal zone (i.e., G' proportional to $\omega^2$ and G" proportional to $\omega$) has not been reached within the frequency range of the experiment thus the complex viscosity $|\eta^*|$ not reaching a plateau value, $\eta_O$ should be measured via melt creep experiments as discussed in C. W. Macosko, Rheology Principles, Measurements and Applications (Wiley-VCH, New York, 1994) and Ansari et al., "Rheology of Ziegler-Natta and Metallocene High-Density Polyethylenes: Broad Molecular Weight Distribution Effects," in 50 RHEOL. ACTA 17-27 (2011). In all the examples presented in this invention, Eq. (1) for determination of the zero-shear-rate viscosity $\eta_O$ was used. From the storage (G') and loss (G") dynamic moduli (C. W. Macosko, Rheology Principles, Measurements and Applications (Wiley-VCH, New York, 1994)), the Loss Tangent (tan δ) is defined as:

$$\tan\delta = \frac{G''}{G'}. \quad (2)$$

The Loss Tangent, tan δ, especially at low angular frequencies (e.g., 0.1 rad/s), is a measure of melt elasticity and relates to the molecular characteristics (e.g., distribution of short and long chains, density of molecular entanglements, chain branching, etc.) of the composition. In the current invention, the first normalstress difference ($N_1$) at a steady shear flow of constant shear rate (γ) is defined and determined as a function of the dynamic moduli, G' and G", as follows (H. M. Laun, "Prediction of elastic strains of polymer melts in shear and elongation," 30 J. RHEOL. 459-501 (1986)):

$$N_1(\dot{\gamma}) = 2G'\left[1+\left(\frac{G'}{G''}\right)^2\right]^{0.7} \text{ for } \omega = \dot{\gamma} \quad (3)$$

where G' and G" refer to an angular frequency ω and the temperature of both SAOS and steady shear experiments is identical, N. Eq. (3) is referred to here as "Laun rule." In the present invention, the steady shear stress $\tau_{yx}$ is calculated from the norm of the complex viscosity |η*| according to the Cox-Merz rule (W. P. Cox and E. H. Merz, "Correlation of dynamic and steady flow viscosities," 28 J. POLYM. SCI. 619-621 (1958)):

$$\tau_{yx}(\dot{\gamma}) = \omega|\eta^*(\omega)| \text{ for } \omega = \dot{\gamma} \quad (4)$$

where the norm of the complex viscosity is calculated from G' and G" as a function of frequency ω as follows (C. W. Macosko, *Rheology Principles, Measurements and Applications* (Wiley-VCH, New York, 1994)):

$$|\eta^*(\omega)| = \frac{(G'^2 + G''^2)^{1/2}}{\omega}. \quad (5)$$

The stress ratio (SR) is defined as follows:

$$SR(\dot{\gamma}) = \frac{N_1(\dot{\gamma})}{\tau_{yx}(\dot{\gamma})}. \quad (6)$$

Applicability of both Cox-Merz (Cox and Merz (1957)) and Laun (Laun (1986)) rules were demonstrated for a variety of polypropylene systems in *Shear and Extensional Rheology of Polypropylene Melts: Experimental and Modeling Studies*, Doufas et al., 55 J. RHEOL. 95 (2011). Based on the above rheological properties, several rheological indexes are defined related to the molecular characteristics of the composition as follows:

Dimensionless Stress Ratio Index $R_1$:

$$R_1 = (SR(500)s^{-1})\eta_o/2040 \quad (7)$$

where $\eta_O$ (Eq. (1)) is in units of Pa·s.

Dimensionless Stress Ratio/Loss Tangent Index $R_2$:

$$R_2 = \frac{\left(\frac{SR(500 \text{ s}^{-1})\eta_o}{\tan\delta(0.1 \text{ rad/s})}\right)}{248} \quad (8)$$

where $\eta_O$ (Eq. (1)) is in Pa·s.

Dimensionless Shear Thinning Index $R_3$:

$$R_3 = \frac{\eta_o}{\eta(500 \text{ s}^{-1})} \quad (9)$$

where the steady shear viscosity η(500 s⁻¹) is calculated from Eq. (5) and use of the Cox-Merz rule (W. P. Cox and E. H. Merz, "Correlation of dynamic and steady flow viscosities," 28 J. POLYM. SCI., 619-621 (1958).

The Dimensionless Loss Tangent/Elasticity Index $R_4$ is defined in (10):

$$R_4 = \frac{\frac{\eta_o}{\tan\delta(0.1 \text{ rad/s})}}{8.55} \quad (10)$$

where $\eta_O$(Eq. (1)) is in units of Pa·s.

As mentioned, the Loss Tangent, tan δ at low angular frequency (e.g., 0.1 rad/s) is sensitive to the molecular structure and relates to the melt longest relaxation time as well as creep related properties (e.g., steady state creep compliance and recoverable creep compliance) (C. W. Macosko, *Rheology Principles, Measurements and Applications* (Wiley-VCH, New York, 1994)). Therefore, the rheological indexes intrinsic to the composition, e.g., those defined in Equations (7)-(8), (10), can be in principle expressed in terms of the longest relaxation time and melt creep properties.

Crystallization Via SAOS Rheology.

Crystallization was monitored via SAOS rheology, where the sample was cooled down from the molten state (at 190° C.) at a fixed cooling rate using a 25 mm parallel plate configuration on an ARES 2001 (TA Instruments) controlled strain rheometer. Sample test disks (25 mm diameter, 2.5 mm thickness) were made with a Carver Laboratory press at 190° C. Samples were allowed to sit without pressure for approximately 3 minutes in order to melt and then held under pressure for 3 minutes to compression mold the sample. The disks were originally approximately 2.5 mm thick; however, after sample trimming off the parallel plates, a gap of 1.9 mm between the plates was used. Thermal expansion of the tools was taken into account during SAOS testing to maintain a constant gap throughout the test. The sample was first heated from room temperature to 190° C. The sample was equilibrated at 190° C. (molten state) for 15 min to erase any prior thermal and crystallization history. The temperature was controlled reproducibly within ±0.5° C. The sample was then cooled from 190° C. at a constant cooling rate of 1° C./min and an angular frequency of 1 rad/s using a strain of 1% lying in the linear viscoelastic region. For termination of the experiment, a maximum torque criterion was used. Upon the onset of crystallization during the rheological test, the instrument goes into an overload condition when maximum torque is reached and the test is stopped automatically. All experiments were performed in a nitrogen atmosphere to minimize any degradation of the sample during rheological testing. Crystallization was observed by a steep/sudden increase of the complex viscosity and a steep/sudden (step-like) decrease of the Loss Tangent tan δ (i.e., a plot of complex viscosity vs. temperature and Loss Tangent vs. temperature depict a neck-like region of sudden change in the rheological properties due to occurrence of crystallization). The "onset crystallization temperature via rheology," $T_{c,rheol}$ is defined as the temperature at which a steep (i.e., neck-like) increase of the complex viscosity and a simultaneous steep decrease of tan δ is observed. The reproducibility of $T_{c,rheol}$ is within ±1° C. The reproducibility of the complex modulus and dynamic moduli as a function of temperature is within 3%.

Differential Scanning calorimetry (DSC)

Peak crystallization temperature ($T_{cp}$), peak melting temperature ($T_{mp}$), and heat of fusion ($\Delta H_f$) were measured via Differential Scanning calorimetry (DSC) on pellet samples using a DSCQ200 (TA Instruments) unit. The DSC was calibrated for temperature using four standards (tin, indium, cyclohexane, and water). The heat flow of indium (28.46 J/g) was used to calibrate the heat flow signal. A sample of 3 to 5 mg of polymer, typically in pellet form, was sealed in a standard aluminum pan with flat lids and loaded into the instrument at room temperature.

In the case of determination of $T_{cp}$ and $T_{mp}$ corresponding to 1° C./min cooling and heating rates, the following procedure was used. The sample was first equilibrated at 25° C. and subsequently heated to 200° C. using a heating rate of 20° C./min (first heat). The sample was held at 200° C. for 5 min to erase any prior thermal and crystallization history. The sample was subsequently cooled down to 95° C. with a constant cooling rate of 1° C./min (first cool). The sample was held isothermal at 95° C. for 5 min before being heated to 200° C. at a constant heating rate of 1° C./min (second heat). The exothermic peak of crystallization (first cool) was analyzed using the TA Universal Analysis software and the peak crystallization temperature ($T_{cp}$) corresponding to 1° C./min cooling rate was determined. The endothermic peak of melting (second heat) was also analyzed using the TA Universal Analysis software and the peak melting temperature ($T_{mp}$) corresponding to 1° C./min cooling rate was determined.

In the case of determination of $T_{cp}$ and $T_{mp}$ corresponding to 10° C./min cooling and heating rates, the following procedure was used. The sample was first equilibrated at 25° C. and subsequently heated to 200° C. using a heating rate of 10° C./min (first heat). The sample was held at 200° C. for 10 min to erase any prior thermal and crystallization history. The sample was subsequently cooled down to 25° C. with a constant cooling rate of 10° C./min (first cool). The sample was held isothermal at 25° C. for 10 min before being heated to 200° C. at a constant heating rate of 10° C./min (second heat). The exothermic peak of crystallization (first cool) was analyzed using the TA Universal Analysis software and the peak crystallization temperature ($T_{cp}$) corresponding to 10° C./min cooling rate was determined. The endothermic peak of melting (second heat) was also analyzed using the TA Universal Analysis software and the peak melting temperature ($T_{mp}$) corresponding to 10° C./min heating rate was determined.

In either method of determining crystallization and melting peak temperatures, the same cooling and heating rate (1° C./min or 10° C./min) was always kept during the second (cool) and third (heat) cycles, respectively. For example, in cases where $T_{mp}$ is listed with its associated heating rate, it is implied that the cooling rate of the preceding cycle was at the same rate as the heating cycle. The percent crystallinity (X %) is calculated using the formula: [area under the DSC curve (in J/g)/H° (in J/g)]*100, where the area under the DSC curve refers here to the first cool cycle and H° is the heat of fusion for the homopolymer of the major monomer component. These values for H° are to be obtained from the *Polymer Handbook, Fourth Edition*, published by John Wiley and Sons, New York 1999, except that a value of 290 J/g is used as the equilibrium heat of fusion (H°) for 100% crystalline polyethylene, a value of 140 J/g is used as the equilibrium heat of fusion (H°) for 100% crystalline polybutene, and a value of 207 J/g (H°) is used as the heat of fusion for a 100% crystalline polypropylene.

In the present invention, the difference between the melting and crystallization peak temperatures ($T_{mp}$-$T_{cp}$) as measured by DSC (either at 1° C./min or 10° C./min temperature ramp rates) is referred to as "the supercooling range" and is expressed in ° C. The "supercooling limit," SCL, is defined according to U.S. Pat. No. 7,807,769 and US 2010/0113718, as follows:

$$SCL = 0.907 T_{mp} - 99.64 \tag{11}$$

where $T_{mp}$ and SCL are expressed in ° C. U.S. Pat. No. 7,807,769 and US 2010/0113718 define SCL with $T_{mp}$ corresponding to a heating rate of 10° C./min (second heat); however, in the present invention Eq. (11) is also used to define SCL at a heating rate of 1° C./min (second heat). The following parameter referred to as "supercooling parameter" SCP is defined here as follows:

$$SCP = T_{mp} - T_{cp} - SCL \tag{12}$$

where all parameters on the right hand side of Eq. (12) are expressed in ° C. and refer to either a temperature ramp rate of 1° C./min or 10° C./min as indicated. In Eq. (12), SCL is calculated from Eq. (11).

Molecular Weights (Mw, Mn, Mz and Mv) by Gel-Permeation Chromatography (GPC).

Molecular weight distributions were characterized using Gel-Permeation Chromatography (GPC), also referred to as Size-Exclusion Chromatography (SEC). Molecular weights (weight average molecular weight $M_w$, number average molecular weight $M_n$, Z average molecular weight $M_z$, and viscosity average molecular weight $M_v$) were determined using High-Temperature Gel-Permeation Chromatography equipped with a Differential Refractive Index Detector (DRI). Experimental details on the measurement procedure are described in the literature by T. Sun, P. Brant, R. R. Chance and W. W. Graessley, 34(19) MACROMOLECULES, 6812-6820 (2001) and in U.S. Pat. No. 7,807,769.

A Polymer Laboratories PL-GPC-220 high temperature SEC system with triple detection and three Polymer Laboratories PLgel 10 micron Mixed B columns was used. The three detectors in series are: Wyatt DAWN "EOS" MALLS 18 angle laser light scattering detector first, followed by the DRI detector and finally by the Differential Viscometer detector. The detector output signals are collected on Wyatt's ASTRA software and analyzed using a GPC analysis program. The detailed GPC conditions are listed in the Table 8 of U.S. Pat. No. 7,807,769. A theoretical basis for the data analysis can also be found in U.S. Pat. No. 7,807,769.

A nominal flow rate of 0.5 cm³/min, and a nominal injection volume of 300 mL were used. The various transfer lines, columns and differential refractometer (the DRI detector, used mainly to determine elution solution concentrations) are contained in an oven at 145° C.

Standards and samples were prepared in inhibited TCB (1,2,4-trichlorobenzene) solvent. Four NBS polyethylene (PE) standards were used for calibrating the GPC. The PE standards were NIST 1482a; NIST 1483a; NIST1484a (narrow PE standards); and NIST 1475a (broad PE standards). The samples were accurately weighted and diluted to a 1.5 mg/mL concentration and recorded. The standards and samples were placed on a PL Labs 260 Heater/Shaker at 160° C. for two hours. These were filtered through a 2.0 micron steel filter cup and then analyzed.

The branching index ($g'_{vis}$) is calculated using the output of the SEC-DRI-LS-VIS method (described on page 37 of U.S. Pat. No. 7,807,769 for g') as follows. The average intrinsic viscosity, $[\eta]_{avg}$, of the sample is calculated by:

$$[\eta]_{avg} = \frac{\sum c_i [\eta]_i}{\sum c_i} \quad (13)$$

where the summations are over the chromatographic slices, i, between the integration limits. The branching index $g'_{vis}$ is defined as:

$$g'_{vis} = \frac{[\eta]_{avg}}{k M_v^\alpha} \quad (14)$$

where, for purpose of this invention and claims thereto, $\alpha=0.695$ and $k=0.000579$ for linear ethylene polymers, $\alpha=0.705$ and $k=0.0002288$ for linear propylene polymers, and $\alpha=0.695$ and $k=0.000179$ for linear butene polymers. The denominator of Eq. (12) represents the calculated theoretical intrinsic viscosity of a linear polymer. $M_V$ is the viscosity-average molecular weight based on molecular weights determined by LS analysis.

Tacticity Determination by $^{13}C$ NMR.

Carbon NMR spectroscopy was used to measure meso pentads, stereo and regio defect concentrations in the polypropylene. Carbon NMR spectra were acquired with a 10-mm broadband probe on a Varian spectrometer having a $^{13}C$ frequency of at least 100 MHz. The samples were prepared in 1,1,2,2-tetrachloroethane-d2 (TCE). Sample preparation (polymer dissolution) was performed at 140° C. where 0.25 grams of polymer was dissolved in an appropriate amount of solvent to give a final polymer solution of 3 ml. In order to optimize chemical shift resolution, the samples were prepared without chromium acetylacetonate relaxation agent.

Chemical shift assignments for the stereo defects (given as stereo pentads) can be found in the literature (L. Resconi, L. Cavallo, A. Fait, and F. Piemontesi, 100 CHEM. REV. 1253-1345 (2000)). The stereo pentads (e.g., mmmm, mmmr, mrm, etc.) can be summed appropriately to give a stereo triad distribution (mm, mr and rr) and the mole percentage diads (m and r). Three types of regio defects were quantified: 2,1-erythro, 2,1-threo and 3,1-insertion. The structures and peak assignments for these are also given in the reference by Resconi et al., The concentrations for all regio defects (punctuations) are given in terms of number of regio defects per 10,000 monomer units ($D_R$). Accordingly, the concentration of stereo defects (punctuations) is given as the number of stereo defects per 10,000 monomer units ($D_S$). The total number of defects per 10,000 monomers ($D_{total}$) is calculated as:

$$D_{total} = D_S + D_R \quad (15)$$

The average meso run length (MRL) represents the total number of propylene units (on the average) between defects (stereo and regio) based on 10,000 propylene monomers and is defined in this invention as follows:

$$MRL = \frac{10,000}{D_{total}} \quad (16)$$

The definition of MRL in this invention [Eq. (16)] is based upon the number of structural chain punctuations or defects that result from propylene insertions that have occurred in a non-regular fashion (stereo and regio defects). It does not include the punctuations due to the presence of comonomer (e.g., ethylene in a polypropylene random copolymer). The regio defects each give rise to multiple peaks in the carbon NMR spectrum, and these are all integrated and averaged (to the extent that they are resolved from the other peaks in the spectrum), to improve the measurement accuracy. The chemical shift offsets of the resolvable resonances used in the analysis are tabulated in U.S. Pat. No. 7,807,769. The average integral for each defect is divided by the integral for one of the main propylene signals (CH3, CH, CH2) and multiplied by 10,000 to determine the defect concentration per 10,000 monomers.

Bulk Physical Properties Measurements.

The flexural modulus (1% secant flexural modulus) is measured according to ASTM D790A, using a crosshead speed of 1.27 mm/min (0.05 in/min) and a support span of 50.8 mm (2.0 in) using an Instron machine.

The tensile properties such as tensile strength at yield (also referred to here as yield stress) and elongation at yield (also referred to here as yield strain) were measured as per ASTM D638, with a crosshead speed of 50.8 mm/min (2.0 in/min) and a gauge length of 50.8 mm (2.0 in), using an Instron machine.

Heat distortion temperature (HDT) is measured according to ASTM D648 using a load of 0.45 MPa (66 psi) or 1.8 MPa (264 psi) as designated.

POY Fiber Testing.

The total denier of the POY fibers expressed in grams per 9000 m of yarn is measured by determining the weight of 90 m of yarn which are winded off the fiber core using an Alfred Suter Co. denier wheel. An average denier per filament (dpf) is defined as the measured denier of the yarn over the number of filaments. Excellent agreement was found between the measured dpf and that calculated from the mass throughput per hole and take-up speed as follows:

$$dpf = \frac{9000 \, W}{u_L}. \quad (17)$$

Tensile testing of POY fibers was performed with a Textechno Statimat™ M unit which is a microprocessor based machine that tests the strength and elongation of yarns and fibers. The instrument used was specifically Statimat M, S/N 23523, CRE type equipped with software FPAM 0210E using a Microsoft operating system. For all tests, the gauge length was 100 mm and the stretching speed was 1270 mm/min.

Nonwoven Fabric Testing.

Fabric basis weight defined as the mass of fabric per unit area was measured by weighing 3 12"×12" fabric pieces and reporting an average value expressed in g/m² (gsm). The fiber thickness is expressed as "denier" or equivalently as "denier per filament" (dpf) and is the weight in grams per 9000 meters of fiber as is commonly known in the art. The fiber diameter and denier per filament (dpf) were related in this invention according to the following equation based on the definition and the mass balance of the spinning process:

$$d = \sqrt{\frac{141471 \, dpf}{\rho}} \quad (18)$$

where d is the diameter of a single fiber in units of microns and is the fiber density (taken in this invention as 900 kg/m$^3$ for polypropylene).

Fibers were isolated and their diameter (thickness) was measured using the following method: a portion of spunbonded fibers (taken from the belt before entering the thermal bonding step) was carefully cut from a larger sample using a fresh double-edge razor blade and a small portion of the fiber sample was isolated for thickness measurement. Special care was taken to avoid elongation or deformation of fibers when handling. Fibers were mounted between a slide and coverslip in an immersion fluid and examined using the polarizing light microscope (Olympus BX50) equipped with a rotating stage, crossed polars, 20× objective lens, and digital camera (Optronics) driven by Media Cybernetics ImagePro image processing software. Fibers were examined under the following conditions: 90° crossed polars; condenser aperture fully open (to minimize diffraction effects that increase the apparent thickness of the fibers); fibers rotated to angle of maximum brightness. Digital images of 15 fibers were acquired and calibrated. Fiber diameters were measured to the nearest micrometer using Media Cybernetics ImagePro image processing software. Fiber denier (dpf) was subsequently calculated from the average measured fiber diameter d via Eq. (18).

Tensile properties of nonwoven fabrics such as tensile (peak) strength and % (peak) elongation in both machine (MD) and cross (CD) directions were measured according to standard method WSP 110.4 (05) with a gauge length of 200 mm and a testing speed of 100 mm/min, unless otherwise indicated. The width of the fabric specimen was 5 cm. For the tensile testing, an Instron machine was used (Model 5565) equipped with Instron Bluehill 2 (version 2.5) software for the data analysis. From the force-elongation tensile curves, the software reports a tensile modulus value (units of N/5 cm/gsm) in both MD and CD directions which is calculated according to the following algorithm:
1. search the data from the first data point to the maximum load value;
2. use the first data point and maximum load point as the start and end values respectively;
3. divide the data between the start and end values into 6 equal regions with 0% overlap;
4. apply a least square fit algorithm to all of the points in each region to determine the slope of each region;
5. determine the pair of consecutive regions that has the highest slope sum; and
6. from this pair, determine which region has the highest slope and assigns the reported modulus value to that region.
A lower value of tensile modulus is indicative of a less stiff and softer fabric.

Softness or "hand" as it is known in the art, is measured using the Thwing-Albert Instruments Co. Handle-O-Meter (Model 211-10-B/AERGLA). The quality of "hand" is considered to be the combination of resistance due to the surface friction and flexibility of a fabric material. The Handle-O-Meter measures the above two factors using an LVDT (Linear Variable Differential Transformer) to detect the resistance that a blade encounters when forcing a specimen of material into a slot of parallel edges. A 3½ digit digital voltmeter (DVM) indicates the resistance directly in gram force. The "total hand" of a given fabric is defined as the average of 8 readings taken on two fabric specimens (4 readings per specimen). For each test specimen (5 mm slot width), the hand is measured on both sides and both directions (MD and CD) and is recorded in grams. A decrease in "total hand" indicates the improvement of fabric softness.

The Elmendorf tear strength (expressed in gr/gsm) of nonwoven fabrics was measured in both MD and CD directions with a Elmendorf tear machine (Thwing Albert Instrument Company) according to ASTM D 1922.

CD peak elongation (also referred to as CD elongation), and CD peak strength (also referred to as CD strength) are determined according to WSP 110.4 (05), using a gauge length of 100 mm and a testing speed of 200 mm/min. MD peak elongation (also referred to as MD elongation), and MD peak strength (also referred to as MD strength) are determined according to WSP 110.4 (05), using a gauge length of 100 mm and a testing speed of 200 mm/min.

Unless otherwise noted, all fabric tests described above were performed at least 20 days from the day of fabric manufacturing to ensure equilibration of properties and account for any effects that may alter the fabric properties over time.

The various descriptive elements and numerical ranges disclosed herein for the inventive propylene polymer compositions can be combined with other descriptive elements and numerical ranges to describe the invention; further, for a given element, any upper numerical limit can be combined with any lower numerical limit described herein. The features of the invention are demonstrated in the following non-limiting examples.

EXAMPLES

A number of controlled rheology propylene polymers were explored, where a base PP resin with MFR of approx. 0.5 to 8 dg/min and preferably from 0.8 to 3 dg/min was peroxide cracked (controlled-rheology propylene polymers) in an extruder to obtain a final MFR in the range of 10 to 25 dg/min. It was surprisingly found that compositions with a certain range of the key melt rheological, tacticity and MFR ratio (e.g., when composition is the result of thermal and/or peroxide visbreaking) parameters described below exhibited the unexpected combination of excellent spinability and high fiber/fabric strength even at low basis weight fabrics (e.g., <15 g/m$^2$).

Materials

A propylene polymer PP-1 was treated according to the peroxide visbreaking procedure described below to obtain the inventive compositions of Examples 1 to 8. PP-1 is reactor grade Ziegler-Natta propylene homopolymer in pellet form having a MFR of 2 dg/min, $M_w/M_n$ of 4.3 and a $T_{mp}$ (10° C./min) of 164.3° C. PP-1 contains an additive package typical of that used in spunmelt nonwoven applications, e.g., as disclosed in WO 2010/087921.

The composition of Example 9 is an extruder (physical) blend of two propylene polymers: A and B in weight ratio of 60/40. Polymer A with an MFR of 13 dg/min was obtained in pellet form from peroxide visbreaking treatment of propylene polymer PP-2 according to the procedure described below. PP-2 is a reactor grade Ziegler-Natta propylene homopolymer having a MFR of 4.5 dg/min, $M_w/M_n$ of 4.7 and a $T_{mp}$ (10° C./min) of 165° C. Polymer B having an MFR of 40 dg/min was obtained in pellet form from peroxide visbreaking treatment of propylene polymer PP-3 according to the procedure described below. PP-3 is a reactor grade Ziegler-Natta propylene-ethylene random copolymer of 2.75% by weight in ethylene with an MFR of 1.7 dg/min. After extruder blending of pelletized polymers A and B in a weight ratio of 60/40, the polymer of Example 9 was obtained with an MFR of 23.5 dg/min and an ethylene content of 1.3% by weight determined by $^{13}$C NMR.

Example 20 is a blend of a controlled rheology Ziegler-Natta homo-polypropylene available from ExxonMobil Chemical Company, Houston Tex. under the tradename PP3155 and propylene polymer PP1 (both in pellet form) in a weight ratio of 70/30 compounded on a 92 mm twin screw extruder.

Inventive Example 21 is a blend of a controlled rheology homo-polypropylene available from ExxonMobil Chemical Company, Houston, Tex. under the tradename PP3155 (MFR of 35 dg/min) and propylene polymer PP1 (both in pellet form) in a weight ratio of 70/30, compounded on a 30 mm twin screw extruder.

Example 22 is a controlled rheology (visbroken) propylene polymer whose base polymer is a blend of a Ziegler-Natta homo-polypropylene available from ExxonMobil Chemical Company, Houston, Tex. under the tradename PP5341E1 (MFR of 0.8 dg/min) and propylene polymer PP1 (both in pellet form) in a weight ratio of 25/75. The base polymer (blend) was treated according to the peroxide visbreaking procedure on a 30 mm twin screw extruder to obtain the inventive compositions of Example 22.

Example 23 is a controlled rheology (visbroken) propylene polymer whose polymer is a reactor grade Ziegler-Natta homopolymer polypropylene available from ExxonMobil Chemical Company, Houston, Tex. under the tradename PP5341E1 (MFR of 0.8 dg/min) in pellet form. The base polymer was treated according to the peroxide visbreaking procedure on a 30 mm twin screw extruder to obtain the inventive compositions of Example 23.

Comparative Examples 10-12 relate to Ziegler-Natta controlled-rheology propylene homopolymers having a MFR of 36 to 39 dg/min and a $T_{mp}$ (10° C./min) of 163° C. available from ExxonMobil Chemical Company, Houston, Tex. under the tradename PP 3155E3.

Comparative Example 13 relates to metallocene reactor grade propylene homopolymer having a MFR of 24 dg/min and a $T_{mp}$ (10° C./min) of 152.5° C. available from ExxonMobil Chemical Company, Houston, Tex. under the tradename Achieve™ 3854.

Comparative Examples 14 and 15 represent metallocene propylene homopolymer having a melt flow index (230° C., 2.16 kg ISO 1133) of 15 dg/min and a Tm of 153° C. available from Total Petrochemicals, Feluy, Belgium under the tradename Lumicene™ MR 2002.

Comparative Examples 16 and 17 represent Ziegler-Natta propylene homopolymer having an MFR of 18 dg/min and a $T_{mp}$ (10° C./min) of 165° C. available from Borealis Group, Port Murray, N.J. under the tradename HF420FB.

Comparative Example 18 is a Ziegler-Natta propylene homopolymer having an MFR of 13.5 dg/min and a $T_{mp}$ (10° C./min) of 163.7° C. available from Lyondell Basell, Houston, Tex. under the tradename Moplen™ HP552N.

Comparative Example 19 is a Ziegler-Natta propylene homopolymer having an MFR of 17 dg/min and a $T_{mp}$ (10° C./min) of 164.7° C. available from Lyondell Basell, Houston, Tex. under the tradename Moplen™ PP567P.

A propylene polymer PP-1 was treated according to the peroxide visbreaking procedure described below to obtain the inventive compositions of Examples 24 to 29. PP-1 is reactor grade Ziegler-Natta propylene homopolymer in granular form having a MFR of 2 dg/min, $M_w/M_n$ of 4.3 and a $T_{mp}$ (10° C./min) of 164.3° C. Inventive compositions 24-29 contain an additive package similar to that used in spunmelt nonwoven applications e.g., as disclosed in WO 2010/087921.

Comparative Example 30 is a Ziegler-Natta propylene homopolymer having an MFR of 13.0 dg/min and a $T_{mp}$ (10° C./min) of 165.4° C. available from ExxonMobil Chemical Company, Houston, Tex. under the tradename PP1024E4.

Comparative Example 31 is a Ziegler-Natta propylene homopolymer having an MFR of 20.0 dg/min and a $T_{mp}$ (10° C./min) of 163.3° C. available from ExxonMobil Chemical Company, Houston, Tex. under the tradename PP1074KNE1.

Comparative Example 32 is a Ziegler-Natta propylene homopolymer having an MFR of 26.6 dg/min and a $T_{mp}$ (10° C./min) of 160.9° C. available from Lyondell Basell, Houston, Tex. under the tradename Moplen™ HP561R (for description of Examples 32-34, the measured MFR and Tm of the available sample is provided, not the MFR per datasheet).

Comparative Example 33 is a Ziegler-Natta propylene homopolymer having an MFR of 23.2 dg/min and a $T_{mp}$ (10° C./min) of 161.3° C. available from Lyondell Basell, Houston, Tex. under the tradename Moplen™ HP462R.

Comparative Example 34 is a Ziegler-Natta propylene homopolymer having an MFR of 26.1 dg/min and a $T_{mp}$ (10° C./min) of 161.0° C. available from L Total Petrochemicals, Feluy, Belgium under the tradename Atofina PPH 9099.

Comparative Example 35 is a Ziegler-Natta propylene homopolymer having an MFR of 27.2 dg/min and a $T_{mp}$ (10° C./min) of 160.6° C. available from Borealis Group, Port Murray, N.J. under the tradename PP HG455FB.

Visbreaking Procedure

The starting propylene polymers were peroxide visbroken (cracked) on a 92 mm twin screw extruder (ZSK 92, Werner Pfleiderer) at a production rate of 3,000 lbs/hr and a screw speed of 440 rpm under $N_2$ purge in the extruder feed throat (inventive Examples 1-8). A peroxide level of 200 to 500 ppm Lupersol™ 101 (2,5-bis(tert-butylperoxy)-2,5-dimethylhexane) was used to crack the starting polymers (inventive Examples 1-8) to a higher MFR (see Table 1). The starting propylene polymers are described under "Materials" above. The extruder had two feeders, one for polymer and one for the peroxide visbreaking agent. The set temperature of the extruder zones and the die was in the range of 190° C. to 220° C., while the melt temperature was in the range of 200° C. to 215° C. depending on the starting propylene polymer and targeted final MFR. A standard 100 mesh wire (150 microns nominal porosity) was used for all extruder runs. In each example, pellets were produced with a density in the range of 40 to 50 ppg (pellets per gram) using an Gala underwater pelletizer.

For inventive examples 24-29, the starting propylene polymer PP-1 in granular form was peroxide visbroken (cracked) on a 320 mm twin screw extruder (ZSK320, Werner Pfleiderer). In each example, pellets were produced with a density in the range of 40 to 50 ppg (pellets per gram) using a Gala underwater pelletizer.

The compositions of Examples 9, 21, 22, 23 were compounded on a 30 mm twin screw extruder (ZSK 30, Werner Pfleiderer) with a screw speed of 165 rpm under $N_2$ purge in the extruder feed throat The polymer properties of the inventive and comparative compositions are reported in Tables 1-7 below.

TABLE 1

Examples

| Example | Reactor (R) or Controlled Rheology (CR) | Final Composition MFR (dg/min) | MFR MFR Ratio |
|---|---|---|---|
| 1 | CR | 16.5 | 8.3 |
| 2 | CR | 17.0 | 8.5 |

TABLE 1-continued

Examples

| Example | Reactor (R) or Controlled Rheology (CR) | Final Composition MFR (dg/min) | MFR MFR Ratio |
|---|---|---|---|
| 3 | CR | 17.0 | 8.5 |
| 4 | CR | 17.0 | 8.5 |
| 5 | CR | 16.7 | 8.4 |
| 6 | CR | 13.0 | 6.5 |
| 7 | CR | 14.2 | 7.1 |
| 8 | CR | 19.0 | 9.5 |
| 9 | CR | 23.5 | 23.5 |
| 10 | CR | 35.0 | 7.8 |
| 11 | CR | 39.0 | 8.7 |
| 12 | CR | 37.0 | 8.2 |
| 13 | R | 24.0 | 1 |
| 14 | R | 15.8 | N/A |
| 15 | R | 14.4 | N/A |
| 16 | CR | 17.7 | N/A |
| 17 | CR | 18.6 | N/A |
| 18 | CR | 13.5 | N/A |
| 19 | CR | 17.0 | N/A |
| 20 | CR (Blend) | 16.7 | 8 |
| 21 | CR (Blend) | 15.6 | 8 |
| 22 | CR (Blend) | 15.3 | 10.1 |
| 23 | CR | 16.1 | 16.7 |
| 24 | CR | 15.3 | 7.7 |
| 25 | CR | 15.2 | 7.6 |
| 26 | CR | 15.4 | 7.7 |
| 27 | CR | 15.3 | 7.7 |
| 28 | CR | 15.3 | 7.7 |
| 29 | CR | 15.4 | 7.7 |
| 30 | CR | 13.0 | 2.9 |
| 31 | CR | 20.0 | 4.4 |
| 32 | N/A | 26.6 | N/A |
| 33 | N/A | 23.2 | N/A |
| 34 | N/A | 26.1 | N/A |
| 35 | N/A | 27.2 | N/A |

In Table 1, N/A for the MFR Ratio implies that this ratio is not available or known in the case of commercial propylene polymers (e.g., comparative Examples 14, 16, 17, 18, 19, 32, 33, 34, and 35). In the case of comparative Example 13, the MFR ratio of 1 implies the absence of a peroxide visbreaking step (reactor grade).

TABLE 2

Rheological properties of inventive and comparative compositions including rheology indexes and onset crystallization temperature under flow determined via SAOS rheology.

| Example | $\eta_o$ (Pa·s) | tanδ @ 0.1 rad/s | SR @ 500 s$^{-1}$ | Rheology Index $R_1$ | Rheology Index $R_2$ | Rheology Index $R_3$ | Rheology Index $R_4$ | $T_{c, rheol}$ (°C.) |
|---|---|---|---|---|---|---|---|---|
| 1 | 1362.1 | 47.1 | 3.68 | 2.5 | 4.3 | 8.2 | 3.4 | 140.0 |
| 2 | 1422.4 | 41.3 | 3.68 | 2.6 | 5.1 | 8.3 | 4.0 | 140.0 |
| 3 | 1293.1 | 56.2 | 3.67 | 2.3 | 3.4 | 8.1 | 2.7 | 137.0 |
| 4 | 1469.8 | 50.1 | 3.74 | 2.7 | 4.4 | 8.3 | 3.4 | 140.0 |
| 5 | 1435.5 | 49.1 | 3.68 | 2.6 | 4.3 | 8.1 | 3.4 | 132.0 |
| 6 | 1737.1 | 34.9 | 3.95 | 3.4 | 7.9 | 9.6 | 5.8 | 138.0 |
| 7 | 1612.1 | 42.3 | 3.86 | 3.0 | 5.9 | 9.1 | 4.5 | 132.0 |
| 8 | 1211.2 | 63.1 | 3.49 | 2.1 | 2.7 | 7.3 | 2.2 | 132.0 |
| 9 | 1090.5 | 45.5 | 3.31 | 1.8 | 3.2 | 7.5 | 2.8 | 136.0 |
| 10 | 702.6 | 82.1 | 2.90 | 1.0 | 1.0 | 5.6 | 1.0 | 128.0 |
| 11 | 706.9 | 71.1 | 2.88 | 1.0 | 1.2 | 5.6 | 1.2 | 130.0 |
| 12 | 694.0 | 87.4 | 2.90 | 1.0 | 0.9 | 5.8 | 0.9 | 136.5 |
| 13 | 952.6 | 161.3 | 3.30 | 1.5 | 0.8 | 5.1 | 0.7 | 124.0 |
| 14 | 1284.5 | 58.2 | 3.63 | 2.3 | 3.2 | 6.9 | 2.6 | 125.0 |
| 15 | 1404.5 | 63.1 | 4.39 | 3.0 | 3.9 | 6.1 | 2.6 | 124.5 |
| 16 | 1392.2 | 52.6 | 3.54 | 2.4 | 3.8 | 7.7 | 3.1 | 126.0 |
| 17 | 1223.9 | 53.8 | 4.38 | 2.6 | 4.0 | 6.5 | 2.7 | 129.0 |
| 18 | 2319.0 | 12.6 | 4.03 | 4.6 | 29.9 | 14.5 | 21.5 | 130.0 |
| 19 | 1456.9 | 48.9 | 3.70 | 2.6 | 4.4 | 8.3 | 3.5 | 128.5 |
| 20 | 1941.1 | 14.3 | 4.87 | 4.6 | 26.7 | 10.6 | 15.9 | 132.0 |
| 21 | 2041.3 | 14.5 | 4.88 | 4.9 | 27.7 | 11.0 | 16.5 | 137.0 |
| 22 | 1319.5 | 70.1 | 4.97 | 3.2 | 3.8 | 6.7 | 2.2 | 132.0 |
| 23 | 1810.0 | 42.5 | 4.20 | 3.7 | 7.1 | 9.9 | 5.0. | 129.0 |
| 24 | 1528.3 | 38.7 | 3.77 | 2.83 | 6.00 | 8.81 | 4.61 | 128 |
| 25 | 1509.8 | 39.2 | 3.77 | 2.79 | 5.86 | 8.94 | 4.51 | 129 |
| 26 | 1445.0 | 35.7 | 3.75 | 2.65 | 6.11 | 8.76 | 4.73 | 129 |
| 27 | 1509.7 | 39.9 | 3.77 | 2.79 | 5.76 | 8.92 | 4.43 | 126 |
| 28 | 1426.5 | 36.4 | 3.72 | 2.60 | 5.87 | 8.72 | 4.58 | 127 |
| 29 | 1445.0 | 36.5 | 3.73 | 2.64 | 5.95 | 8.76 | 4.63 | 126 |
| 30 | 2290.9 | 23.6 | 5.2 | 5.9 | 20.5 | 10.7 | 11.4 | 129 |
| 31 | 1133.0 | 60.2 | 3.42 | 1.90 | 1.90 | 7.65 | 2.20 |  |
| 32 | 846.4 | 86.2 | 3.08 | 1.28 | 1.22 | 5.90 | 1.15 | 131.5 |
| 33 | 935.3 | 84.9 | 3.18 | 1.46 | 1.41 | 6.62 | 1.29 | 128 |
| 34 | 861.2 | 85.3 | 3.11 | 1.31 | 1.26 | 5.83 | 1.18 | 133 |
| 35 | 794.5 | 106.3 | 3.05 | 1.19 | 0.92 | 5.72 | 0.87 | 127 |

Figure 2:
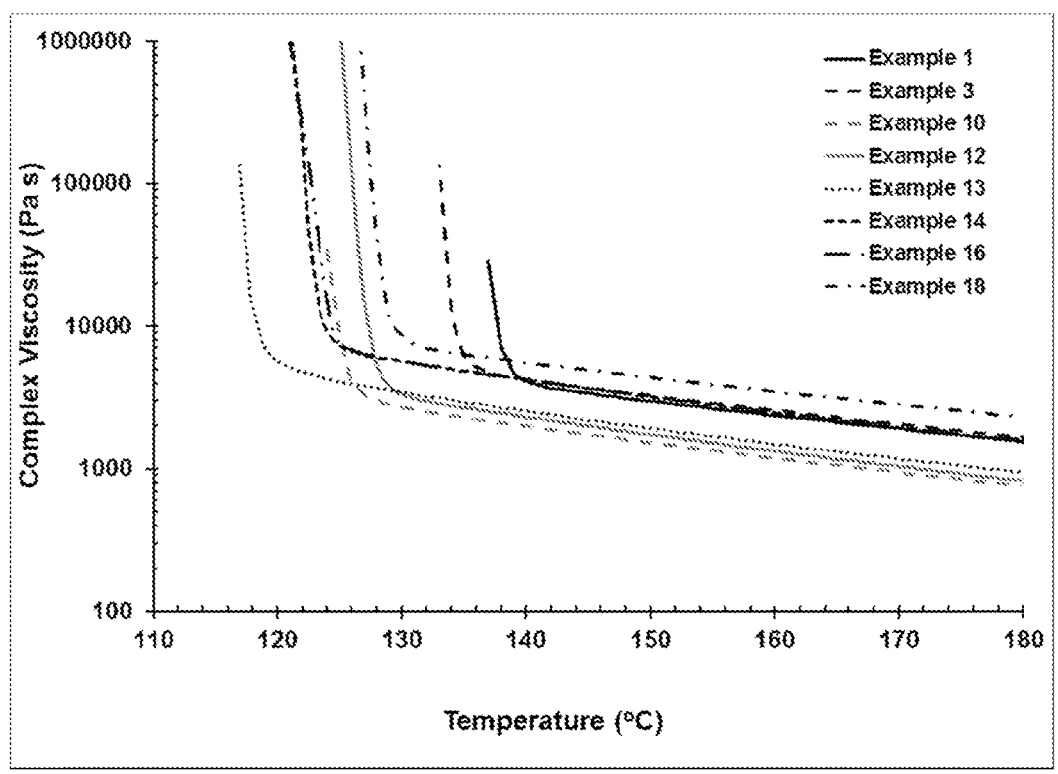
FIG. 2 depicts the evolution of the complex viscosity of Examples 1, 3, 10, 12, 13, 14, 16, and 18 under a cooling SAOS rheological experiment.

SAOS rheological experiment according to the "Crystallization via SAOS rheology" method described above. In FIG. 2, the corresponding profiles of the complex viscosity with temperature for certain illustrative compositions are depicted. With decrease of temperature, the complex viscosity increases in a linear function in a log-linear plot. However, below a certain temperature, the complex viscosity abruptly increases due to occurrence of crystallization under SAOS flow.

TABLE 3

Thermal (DSC) properties of inventive and comparative compositions at a heating and cooling rate of 1° C./min.

| Example | $T_{c,p}$ (° C.) | $T_{m,p}$ (° C.) | $\Delta H_{cryst}$ (cal/g) | SCL (° C.) | SCP (° C.) |
|---|---|---|---|---|---|
| 1 | 134.7 | 167.7 | 108.2 | 52.5 | −19.5 |
| 2 | 134.4 | 165.1 | 105.2 | 50.1 | −19.4 |
| 3 | 131.4 | 166.8 | 106.5 | 51.6 | −16.3 |
| 4 | 130.1 | 164.7 | 106.4 | 49.7 | −15.1 |
| 5 | 126.0 | 163.8 | 94.2 | 48.9 | −11.1 |
| 6 | 134.4 | 167.7 | 105.0 | 52.4 | −19.2 |
| 7 | 126.3 | 163.1 | 93.6 | 48.3 | −11.5 |
| 8 | 126.2 | 163.5 | 113.0 | 48.7 | −11.3 |
| 9 | 131.6 | 164.6 | 84.8 | 49.7 | −16.7 |
| 10 | 122.3 | 170.2 | 91.1 | 54.7 | −6.8 |
| 11 | 130.7 | 163.4 | 97.1 | 48.5 | −15.9 |
| 12 | 132.6 | 166.7 | 96.3 | 51.5 | −17.5 |
| 13 | 115.9 | 152.5 | 88.7 | 38.7 | −2.0 |
| 14 | 119.2 | 154.0 | 87.6 | 40.0 | −5.3 |
| 15 | 116.0 | 152.7 | 82.6 | 38.9 | −2.1 |
| 16 | 120.7 | 169.1 | 100.8 | 53.7 | −5.3 |
| 17 | 120.5 | 167.4 | 97.6 | 52.2 | −5.3 |
| 18 | 126.8 | 164.7 | 101.9 | 49.8 | −11.9 |
| 19 | 124.7 | 163.5 | 100.3 | 48.7 | −9.9 |
| 20 | 127.5 | 163.9 | 108.1 | 49.0 | −12.6 |
| 21 | 132.51 | 167.1 | 109.6 | 51.9 | −17.3 |
| 22 | 127.89 | 165.1 | 100.4 | 50.1 | −12.9 |
| 23 | 125 | 162.6 | 99.3 | 47.9 | −10.2 |
| 25 | 122.9 | 163.1 | 91.8 | 48.3 | −8.0 |
| 27 | 120.5 | 169.1 | 88.0 | 53.7 | −5.1 |
| 29 | 121.3 | 168.7 | 99.9 | 53.3 | −5.9 |
| 30 | 122.8 | 164.7 | 101.9 | 50.3 | 3.5 |

*The supercooling limit SCL is calculated according to Eq. (11) with $T_{mp}$ at 1° C./min.
*The supercooling parameter SCP is calculated according to Eq. (12) with $T_{mp}$ and $T_{cp}$ at 1° C./min.

TABLE 4

Thermal (DSC) properties of inventive and comparative compositions at a heating and cooling rate of 10° C./min.

| Example | $T_{c,p}$ (° C.) | $T_{m,p}$ (° C.) | $\Delta H_{cryst}$ (cal/g) | SCL (° C.) | SCP (° C.) |
|---|---|---|---|---|---|
| 1 | 122.7 | 164.5 | 96.3 | 49.5 | −7.8 |
| 2 | 120.1 | 163.3 | 101.0 | 48.5 | −5.3 |
| 3 | 120.2 | 164.0 | 110.8 | 49.1 | −5.3 |
| 4 | 119.7 | 163.6 | 101.4 | 48.8 | −4.8 |
| 5 | 116.4 | 160.3 | 110.0 | 45.7 | −1.9 |
| 6 | 123.5 | 163.7 | 106.7 | 48.9 | −8.6 |
| 7 | 115.9 | 161.3 | 106.0 | 46.7 | −1.3 |
| 8 | 118.5 | 161.8 | 106.3 | 47.1 | −3.8 |
| 9 | 120.4 | 160.3 | 95.6 | 45.7 | −5.9 |
| 10 | 110.9 | 158.7 | 102.3 | 44.3 | 3.5 |
| 11 | 123.2 | 162.7 | 105.7 | 47.9 | −8.5 |
| 12 | 121.3 | 165.0 | 109.7 | 50.0 | −6.3 |
| 13 | 109.0 | 149.4 | 89.3 | 35.9 | 4.5 |
| 14 | 107.3 | 151.2 | 90.6 | 37.5 | 6.4 |
| 15 | 107.4 | 150.9 | 92.4 | 37.3 | 6.3 |
| 16 | 109.4 | 164.9 | 95.9 | 49.9 | 5.5 |
| 17 | 110.5 | 163.8 | 89.0 | 48.9 | 4.4 |
| 18 | 116.7 | 163.7 | 101.6 | 48.9 | −1.9 |
| 19 | 116.4 | 164.7 | 99.7 | 49.7 | −1.4 |
| 20 | 119.5 | 163.4 | 102.8 | 48.6 | −4.7 |
| 21 | 121.8 | 162.1 | 101.2 | 47.4 | −7.1 |
| 22 | 115.5 | 160.8 | 94.4 | 46.2 | −0.9 |
| 23 | 114.2 | 160.1 | 95.7 | 45.5 | 0.4 |
| 24 | 110.2 | 162.5 | 93.1 | 47.7 | 4.6 |
| 25 | 112.0 | 160.5 | 96.7 | 45.9 | 2.5 |
| 26 | 110.4 | 164.8 |  | 49.9 | 4.6 |
| 27 | 111.4 | 162.2 | 97.0 | 47.4 | 3.3 |
| 28 | 111.3 | 160.5 |  | 46.0 | 3.3 |
| 29 | 112.0 | 163.7 | 97.9 | 48.8 | 2.8 |
| 30 | 111.5 | 165.4 | 97.8 | 50.3 | 3.5 |
| 31 | 118.5 | 163.3 | 86.2 | 50.3 | 3.5 |
| 32 | 116.6 | 160.9 | 101.8 | 48.5 | −3.6 |
| 33 | 114.6 | 161.3 | 92.1 | 46.3 | −2.0 |
| 34 | 119.5 | 161.0 | 101.4 | 46.7 | 0.0 |
| 35 | 117.3 | 160.6 | 100.9 | 46.4 | −4.9 |

*The supercooling limit SCL is calculated according to Eq. (11) with $T_{mp}$ at 10° C./min.
*The supercooling parameter SCP is calculated according to Eq. (12) with $T_{mp}$ and $T_{cp}$ at 10° C./min.

TABLE 5

Molecular weight (GPC) and intrinsic viscosity data of inventive and comparative compositions.

| Example | $M_w$ (kg/mol) | $M_n$ (kg/mol) | $M_z$ (kg/mol) | $M_v$ (kg/mol) | $M_w/M_n$ | $M_z/M_w$ | Intrinsic Viscosity (dg/l) |
|---|---|---|---|---|---|---|---|
| 1 | 204.9 | 71.7 | 367.1 | 184.8 | 2.86 | 1.79 | 1.249 |
| 2 | 202.9 | 73.8 | 377.8 | 182.7 | 2.75 | 2.12 | 1.194 |
| 3 | 207.1 | 76.1 | 372.6 | 186.9 | 2.72 | 1.80 | 1.198 |
| 4 |  |  |  |  |  |  |  |
| 5 | 203.9 | 65.6 | 376.7 | 183.6 | 3.11 | 1.85 | 1.222 |
| 6 | 205.4 | 71.5 | 360.1 | 185.4 | 2.87 | 1.75 | 1.245 |
| 7 | 209.4 | 61.2 | 382.4 | 187.8 | 3.42 | 1.83 | 1.248 |
| 8 | 190.5 | 58.2 | 344.9 | 171.6 | 3.27 | 1.81 | 1.170 |
| 9 | 190.6 | 56.3 | 395.4 | 168.0 | 3.40 | 2.07 | 1.140 |
| 10 | 183.3 | 62.9 | 358.0 | 164.1 | 2.92 | 1.95 | 1.153 |
| 11 |  |  |  |  |  |  |  |
| 12 | 196.8 | 62.4 | 409.6 | 173.9 | 3.15 | 2.08 | 1.140 |
| 13 | 188.9 | 81.9 | 288.8 | 175.0 | 2.31 | 1.53 | 1.148 |
| 14 | 198.7 | 90.5 | 313.7 | 183.7 | 2.20 | 1.58 | 1.185 |
| 15 | 201.0 | 83.5 | 307.0 | 186.5 | 2.41 | 1.53 | 1.220 |
| 16 | 220.1 | 72.4 | 410.6 | 197.1 | 3.04 | 1.87 | 1.261 |
| 17 | 202.5 | 62.2 | 382.3 | 181.1 | 3.26 | 1.89 | 1.212 |
| 18 | 220.9 | 52.3 | 520.9 | 191.0 | 4.23 | 2.36 | 1.239 |
| 19 | 195.8 | 53.6 | 359.2 | 175.4 | 3.65 | 1.84 | 1.161 |
| 20 | 226.6 | 56.3 | 628.4 | 195.5 | 4.02 | 2.77 | 1.315 |
| 21 | 231.7 | 61.1 | 641.1 | 199.3 | 3.79 | 2.77 | 1.330 |
| 22 | 206.8 | 60.4 | 384.5 | 185.1 | 3.43 | 1.86 | 1.238 |
| 23 | 212.5 | 65.7 | 382.0 | 191.2 | 3.24 | 1.80 | 1.276 |
| 24 | 206.7 | 66.5 | 388.3 | 182.6 | 3.11 | 1.88 | 1.226 |
| 25 | 198.0 | 68.3 | 364.3 | 178.3 | 2.90 | 1.84 | 1.195 |
| 26 | 189.1 | 65.4 | 334.1 | 170.8 | 2.89 | 1.77 | 1.154 |
| 27 | 188.1 | 64.8 | 345.9 | 169.3 | 2.90 | 1.84 | 1.153 |
| 28 | 199.3 | 66.5 | 369.4 | 179.4 | 3.00 | 1.85 | 1.197 |
| 29 | 195.2 | 59.5 | 351.4 | 175.6 | 3.28 | 1.80 | 1.176 |
| 30 | 230.0 | 54.3 | 480.6 | 202.0 | 4.24 | 2.09 | 1.322 |

TABLE 6

$^{13}$C NMR tacticity data of inventive and comparative compositions

| Example | Average Meso Run Length | % Molar Meso Pentads (mmmm) | Stereo Defects/ 10,000 Propylene Monomers | Regio Defects/ 10,000 Propylene Monomers | Total Defects/ 10,000 Monomers |
|---|---|---|---|---|---|
| 1 | 107 | 0.952 | 93 | 1 | 94 |
| 2 | 101 | 0.948 | 99 | 0 | 99 |
| 3 | 97 | 0.956 | 103 | 0 | 103 |
| 4 | 103 | 0.948 | 96 | 1 | 97 |
| 5 | 112 | 0.952 | 88 | 1 | 89 |
| 6 | 105 | 0.954 | 95 | 0 | 95 |
| 7 | 110 | 0.951 | 90 | 1 | 91 |
| 8 | 103 | 0.949 | 97 | 1 | 98 |
| 9 | 91 | 0.909 | 110 | 0 | 110** |
| 10 | 105 | 0.952 | 95 | 0 | 95 |
| 11 | 103 | 0.952 | 97 | 0 | 97 |
| 12 | 103 | 0.950 | 97 | 0 | 97 |
| 13 | 68 | 0.947 | 109 | 35 | 144 |
| 14 | 91 | 0.990 | 23 | 85 | 108 |
| 15 | 81 | 0.981 | 44 | 79 | 122 |
| 16 | 67 | 0.924 | 149 | 0 | 149 |
| 17 | 60 | 0.918 | 164 | 2 | 166 |
| 18 | 95 | 0.946 | 105 | 0 | 105 |
| 19 | 68 | 0.928 | 146 | 2 | 148 |
| 20 | 90 | 0.946 | 110 | 2 | 112 |
| 21 | 100 | 0.955 | 100 | 0 | 100 |
| 22 | 73 | 0.928 | 137 | 0 | 137 |
| 23 | 57 | 0.910 | 174 | 0 | 174 |
| 24 | 96 | 0.946 | 104 | 0 | 104 |
| 25 | 92 | 0.947 | 108 | 0 | 108 |
| 26 | 89 | 0.946 | 113 | 0 | 113 |
| 27 | 98 | 0.950 | 102 | 0 | 102 |
| 28 | 90 | 0.948 | 112 | 0 | 112 |
| 29 | 94 | 0.947 | 107 | 0 | 107 |
| 30 | 116 | 0.956 | 86 | 0 | 86 |
| 31§ | 116 | 0.956 | 86 | 0 | 86 |
| 32 | 62 | 0.925 | 159 | 3 | 162 |
| 33 | 59 | 0.912 | 170 | 0 | 170 |
| 34 | 68 | 0.930 | 147 | 0 | 147 |
| 35 | 48 | 0.933 | 156 | 0 | 209 |

*The average meso run length (MSL) is calculated according to Eq. (16).
**Total defects for Example 9 represent the sum of structural chain punctuations or defects (stereo and regio defects) per 10,000 propylene monomers but do not include defects due to the presence of ethylene in this sample.
§The values for this comparative example are estimated based on knowledge of the catalyst and process used to make it.

TABLE 7

Bulk Physical properties data of inventive and comparative compositions.

| Example | 1% Secant Flexural Modulus (kpsi) | Yield Stress (psi) | % Yield Strain | HDT at 66 psi (° C.) | HDT at 264 psi (° C.) |
|---|---|---|---|---|---|
| 1 | 210 | 5091 | 10.0 | 106.8 | 58.7 |
| 3 | 209 | 5022 | 10.0 | 103.3 | 59.6 |
| 5 | 218 | 5022 | 9.5 | 96.6 | 57.6 |
| 7 | 215 | 5002 | 9.5 | 99.1 | 57.0 |
| 8 | 219 | 5076 | 9.5 | 99.4 | 58.1 |
| 12 | 213 | 5096 | 9.5 | 106.9 | 60.0 |
| 13 | 192 | 4663 | 9.2 | 98.3 | 56.6 |
| 15 | 199 | 4839 | 9.0 | 99.2 | 57.2 |
| 17 | 187 | 4573 | 11.4 | 88.5 | 53.5 |
| 24 | 223 | 5234 | 8.9 | 109.3 | 58.2 |
| 26 | 229 | 5093 | 9.8 | 101.8 | 56.5 |
| 27 | 225 | 5300 | 9.2 | 103.1 | 57.4 |
| 29 | 219 | 5270 | 9.0 | 101.0 | 55.8 |

The above polymer compositions were then formed into fibers and nonwovens according to the following procedures:

Fiber Spinning (Partially Oriented Yarns)

Fiber spinning experiments were implemented on a Hills pilot line equipped with a Davis Standard 1½ inches extruder and a spinneret of 72 holes each of diameter of 0.60 mm. The polymer pellets were melted and extruded into a metering pump at the desired throughput rate. Melt temperature at the die was kept at 237° C. for all resins for consistency, unless otherwise indicated. The quench air system was kept off Throughput per hole was set at 0.53 gr/min/hole (ghm). Two take-up speeds were explored: 1500 and 3500 m/min as indicated. Under these conditions, fiber denier per filament (dpf) was 3.2 and 1.4 according to Eq. (17) for a take-up speed 1500 m/min and 3500 m/min, respectively. The fiber samples were drawn on a godet roll set at the desired take-up speed and the fibers were collected on a core using a winder. No additional drawing step was performed. Tensile properties of the as-spun fibers are shown in Table 8.

As seen in Table 8, the inventive compositions overall give an excellent balance of fiber tenacity and elongation to break relative to compositions of prior art. For example, inventive composition of Example 5 gives significantly higher elongation to break (108%) relative to comparative composition of Example 15 (81%) at similar fiber tenacity for both compositions (about 3 g/dpf) at a fiber denier of 1.3 dpf. Inventive Composition 21 provides unexpectedly very high fiber % elongation (about 171%) at high fiber tenacity (about 2.9 g/dpf) for 1.3 dpf.

Spinability was assessed via a "ramp to break" experiment according to which spinning starts at 2000 m/min and is increased at a fixed acceleration rate (480 m/min$^2$) until fiber breakage, while all other processing conditions are kept constant. The speed at which fiber breaks are observed is referred to as max spin speed. Each ramp to break test was performed at a throughput of 0.53 ghm and 0.32 ghm. From the max spin speed and throughput per hole, one can estimate the minimum denier per filament that can be produced for a given resin before breakage according to Eq. (17) above. Excellent spinability is defined here as the ability of a certain composition to produce fibers of minimum dpf less than 2.0 and preferably less than 1.5 at a throughput range of 0.32 to 0.52 ghm. The results of the ramp to break experiments are shown in Table 9.

As depicted in Table 9, the inventive compositions present excellent spinability attested by their ability to make thin fibers of less than 1.5 dpf for a throughput range of 0.32 to 0.52 ghm.

(Eq. (18)) above. Line speed was kept constant at 900 m/min. Targeted fabric basis weight for all examples was 10 g/m$^2$ (gsm).

The formed fabric was thermally bonded by compressing it through a set of two heated rolls (calenders) for improving fabric integrity and improving fabric mechanical properties. Fundamentals of the fabric thermal bonding process can be found in the review paper by Michielson et al., "Review of Thermally Point-bonded Nonwovens: Materials, Processes, and Properties", 99 J. APPLIED POLYM. SCI. 2489-2496 (2005) or the paper by Bhat et al., "Thermal Bonding of Polypropylene Nonwovens: Effect of Bonding Variables on the Structure and Properties of the Fabrics," 92 J. APPLIED POLYM. SCI., 3593-3600 (2004). The two rolls are referred to as "embossing" and S rolls. In Table 10, the set temperature of the two calenders is listed corresponding to the set oil temperature used as the heating medium of the rolls. The calender temperature was measured on both embossing and S rolls using a contact thermocouple and was typically found

TABLE 8

Tensile properties (tenacity and elongation at break) of POY fibers for inventive and comparative examples.

| Example | Average dpf (0.53 ghm, 1500 m/min) | Tenacity (g/dpf) (0.53 ghm, 1500 m/min) | % Elongation at Break (0.53 ghm, 1500 m/min) | Average dpf (0.53 ghm, 3500 m/min) | Tenacity (g/dpf) (0.53 ghm, 3500 m/min) | % Elongation at Break (0.53 ghm, 3500 m/min) |
|---|---|---|---|---|---|---|
| 1 | 3.1 | 2.8 | 226.8 | 1.2 | 2.95 | 110.0 |
| 5 | 3.1 | 2.69 | 218.6 | 1.3 | 3.00 | 107.9 |
| 7 | 3.1 | 2.67 | 196.1 | 1.4 | 2.49 | 91.1 |
| 8 | 3.1 | 2.66 | 205.2 | 1.3 | 2.93 | 114.9 |
| 12 | 3.0 | 2.63 | 211.4 | 1.3 | 2.94 | 96.5 |
| 13* | 3.0 | 2.98 | 168.3 | 1.3 | 4.11 | 52.0 |
| 15 | 3.0 | 3.04 | 196.2 | 1.3 | 3.18 | 80.6 |
| 17 | 3.0 | 2.83 | 217.9 | 1.4 | 3.00 | 108.2 |
| 21* | 2.9 | 2.01 | 318.7 | 1.3 | 2.87 | 171.4 |

*The melt temperature for Examples 13 and 21 was 265.5° C.

TABLE 9

Maximum (break) spin speed and minimum achievable denier per filament (dpf) for POY fiber spinning for inventive and comparative examples.

| Example | Max Spin Speed (m/min) at 0.53 ghm | Min dpf at 0.53 ghm | Max Spin Speed (m/min) at 0.32 ghm | Min dpf at 0.32 ghm |
|---|---|---|---|---|
| 1 | 5000 | 0.9 | 4100 | 0.7 |
| 5 | 4300 | 1.1 | 3500 | 0.8 |
| 7 | 3600 | 1.3 | 2500 | 1.2 |
| 8 | 4200 | 1.1 | 3400 | 0.8 |
| 12 | 5000 | 0.9 | 4250 | 0.7 |
| 13* | 4500 | 1.0 | 3500 | 0.8 |
| 15 | 5000 | 0.9 | 4100 | 0.7 |
| 17 | 4900 | 1.0 | 4050 | 0.7 |
| 20 | 3975 | 1.2 | 2825 | 1.0 |
| 21* | 4970 | 0.9 | 2900 | 1.0 |

*The melt temperature for Examples 13 and 21 was 265.5° C.

Spunbond Nonwoven Fabrics

Spunbonded nonwoven fabrics were produced on a Reicofil 4 (R4) line with 3 spunbond (SSS) of 1.1 m width each having a spinneret of 6300 holes with a hole (die) diameter of 0.6 mm. For a detailed description of Reicofil spunbonding process, please refer to EP 1 340 843 or U.S. Pat. No. 6,918,750. The throughput per hole was 0.53 ghm. The quench air temperature was 20° C. for all experiments. Under these conditions, fibers of 1 to 1.4 denier were produced, equivalent to a fiber diameter of 12 to 15 microns to be 10° C. to 20° C. lower than the set oil temperature. All three spunbonding beams had similar operating conditions. Representative operating conditions are summarized in Table 10. In a typical trial, after establishing stable spinning conditions, the calendar temperature was varied to create the bonding curve (i.e., tensile strength versus calendar temperature). Under the conditions of Table 10, the spinability of the inventive compositions was assessed to be excellent.

In Table 11, the fabric tensile properties are summarized corresponding to the calendar temperatures resulting in the maximum CD tensile strength. At severe processing conditions of high line speed (900 m/min), high throughput (~0.53 ghm) and low basis weight (10 gsm) that are expected to deteriorate the mechanical properties of the fabrics, most inventive compositions surprisingly depicted high specific tensile strength in both MD and CD directions (higher than 2.7 N/5 cm/gsm in MD and higher than 1.1 N/5 cm/gsm in CD). The inventive compositions have advantageously lower tensile strength anisotropy (e.g., lower than 2.6), e.g., 2.9 for comparative composition of Example 15 and 3.2 for comparative composition of Example 13.

In Table 12, it is shown that the compositions of the present invention lead to advantageously softer fabrics as attested by both a lower tensile modulus (particularly MD modulus) and lower total hand.

Elmendorf tear strength for inventive and comparative examples for both MD and CD fabric directions is shown in Table 13. The inventive compositions produce fabrics of overall comparable or higher tear strength over those of compositions of prior art.

TABLE 10

Processing conditions of non-woven spunbonding fabrics of inventive and comparative examples. In all cases, 3 spunbonding beams were used (SSS) with a line speed of 900 m/min and a nominal fabric basis weight of 10 g/m².

| Example | Filament Denier | Melt Temperature at the Die (° C.) | Throughput per hole (g/min/hole) | Cabin Pressure (psi) | Air Volume Ratio $V_1/V_2$ | Calender Set Temperatures For Maximum CD Tensile Strength (° C.) |
|---|---|---|---|---|---|---|
| 1 | 1.3 | 257 | 0.53 | 5300 | 0.12 | 176/165 |
| 4 | 1.2 | 257 | 0.52 | 5300 | 0.12 | 184/165 |
| 5 | 1.3 | 259 | 0.53 | 5300 | 0.13 | 180/165 |
| 9 | 1.1 | 260 | 0.52 | 5000 | 0.15 | 164/165 |
| 10 | 1.2 | 241 | 0.52 | 7000 | 0.11 | 169/165 |
| 11 | N/A | 235 | 0.52 | 5500 | 0.15 | 168/164 |
| 13 | 1.2 | 231 | 0.52 | 7200 | 0.12 | 162/159 |
| 15 | 1.3 | 259 | 0.53 | 5300 | 0.21 | 186/171 |

TABLE 11

Fabric tensile strength properties for inventive and comparative examples. The fabric tensile data correspond to fabrics produced at the calendar set temperatures of Table 10 resulting in the maximum CD tensile strength.

| Example | Fabric Basis Weight (gsm) | MD Specific Tensile Strength at Peak Load (N/5 cm/gsm) | CD Specific Tensile Strength at Peak Load (N/5 cm/gsm) | Tensile Strength Anisotropy MD/CD | MD % Elongation at Peak Load | CD % Elongation at Peak Load |
|---|---|---|---|---|---|---|
| 1 | 9.5 | 3.19 | 1.22 | 2.61 | 45.8 | 63.3 |
| 4 | 9.8 | 2.68 | 1.14 | 2.35 | 35.1 | 60.4 |
| 5 | 9.7 | 3.01 | 1.16 | 2.58 | 39.5 | 66.4 |
| 9 | 10.2 | 2.55 | 0.96 | 2.65 | 47.8 | 64.5 |
| 10 | 10.7 | 2.39 | 0.97 | 2.46 | 35.1 | 55.7 |
| 11 | 10.0 | 2.76 | 0.93 | 2.97 | 44.2 | 59.0 |
| 13 | 9.8 | 2.73 | 0.85 | 3.23 | 24.3 | 39.0 |
| 15 | 9.9 | 3.35 | 1.14 | 2.93 | 39.0 | 55.3 |

TABLE 12

Fabric stiffness and softness related properties for inventive and comparative examples. The listed properties correspond to fabrics produced at the calender set temperatures of Table 10 resulting in the maximum CD tensile strength.

| Example | MD Tensile Modulus (N/5 cm/gsm) | CD Tensile Modulus (N/5 cm/gsm) | MD Hand (gr) | CD Hand (gr) | Total Hand (gr) |
|---|---|---|---|---|---|
| 1 | 29.0 | 2.8 | 8.65 | 3.63 | 6.14 |
| 4 | 26.0 | 2.6 | 9.25 | 4.40 | 6.83 |
| 5 | 32.1 | 2.4 | 8.55 | 3.70 | 6.13 |
| 9 | 23.8 | 1.9 | 7.75 | 3.03 | 5.39 |
| 10 | 23.8 | 2.5 | 8.70 | 3.33 | 6.01 |
| 11 | 28.9 | 2.5 | 9.05 | 3.83 | 6.44 |
| 13 | 37.1 | 3.5 | 10.28 | 3.65 | 6.96 |
| 15 | 36.2 | 2.8 | 9.88 | 3.90 | 6.89 |

TABLE 13

Fabric Elmendorf tear strength for inventive and comparative examples. The listed properties correspond to fabrics produced at the calender set temperatures of Table 10 resulting in maximum CD tensile strength.

| Example | MD Elmendorf Tear Strength (gr/gsm) | CD Elmendorf Tear Strength (gr/gsm) |
|---|---|---|
| 1 | 10.7 | 17.2 |
| 4 | 8.7 | 15.0 |
| 5 | 9.9 | 13.5 |
| 9 | 8.5 | 13.7 |
| 10 | 7.5 | 16.0 |
| 11 | N/A | N/A |
| 13 | 12.8 | 16.5 |
| 15 | 11.5 | 16.7 |

Additional Fabric Properties

Tear properties of fabrics on tongue-shaped test pieces, was determined by DIN EN ISO 13937-4. Nonwoven trapezoid tear resistance was determined by DIN EN ISO 9073-4. Determination of breaking strength and elongation of nonwoven materials using the grab tensile test was obtained according to DIN EN ISO 9073-18. The bursting strength of fabrics, pneumatic method of determination of bursting strength and bursting distension, was determined according to DIN EN ISO 13938-2. Abrasion resistance of fabrics was determined by the Martindale method (DIN EN ISO 12947-2). Nonwoven bending length was determined by DIN EN ISO 9073-7. Drapability of nonwovens, including drape coefficient, was determined by DIN EN ISO 9073-9.

Three polymer compositions, a polymer having an MFR of 16.5 dg/min made using the same procedure as Example 1 (referred to as EX1-A), Lumicene™ MR2002, and PP3155, were formed into nonwoven fabrics according to the general procedure for Spunbond Nonwoven Fabrics detailed above including that 3 spunbonding beams were used (SSS) with a line speed of 900 m/min and a nominal fabric basis weight of 10 g/m². Specific process conditions are listed in Table 14 below.

Grab Tensile data, reported in Table 15 below were obtained according to the procedure in DIN EN 9073-18. Tongue tear data, reported in Table 16, were determined according to DIN EN ISO 9073-4. Burst strength, reported in Table 16, were obtained according to ISO 13938-2 1999.

TABLE 14

Processing conditions of non-woven spunbonding fabrics. In all cases, 3 spunbonding beams were used (SSS) with a line speed of 900 m/min and a nominal fabric basis weight of 10 g/m²

| Example | Resin | Filament Denier (dpf) | Melt Temperature at the Die (° C.) | Throughput per hole (g/min/hole) | Cabin Pressure (psi) | Air Volume Ratio $V_1/V_2$ | Calender Set Temperatures For Maximum CD Tensile Strength (° C.) |
|---|---|---|---|---|---|---|---|
| A-1 | EX1-A | 1.3 | 258 | 0.53 | 5300 | 0.14 | 180/165 |
| A-2 | Lumicene MR 2002 | 1.3 | 259 | 0.53 | 5300 | 0.21 | 182/171 |
| A-3 | EX1-A | N/A | 245 | 0.53 | 4500 | 0.25 | 168/165 |
| A-4 | Lumicene MR 2002 | 1.4 | 259 | 0.53 | 5300 | 0.21 | 176/171 |
| A-5 | PP3155 | 1.4 | 235 | 0.53 | 5500 | 0.25 | 168/164 |

TABLE 15

Fabric Grab Tensile Properties

| Example | Fabric Basis Weight (gsm) | MD Grab Tensile Peak Load (N) | MD Grab Tensile Peak Load (N/gsm) | MD Length Change at Peak Load (mm) | MD % Elongation at Peak Load | CD Grab Tensile Peak Load (N) | CD Grab Tensile Peak Load (N/gsm) | CD Length Change at Peak Load (mm) | CD % Elongation at Peak Load |
|---|---|---|---|---|---|---|---|---|---|
| A-1 | 9.8 | 40.64 | 4.15 | 35.1 | 46.5 | 21.05 | 2.15 | 58.4 | 76.3 |
| A-2 | 9.8 | 41.53 | 4.24 | 29.8 | 39.5 | 20.7 | 2.11 | 57.8 | 75.6 |
| A-3 | 9.8 | 37.53 | 3.83 | 33.7 | 44.7 | 19.04 | 1.94 | 52.6 | 69.1 |
| A-4 | 9.7 | 42.92 | 4.42 | 32.1 | 42.6 | 21.07 | 2.17 | 50.3 | 66.1 |
| A-5 | 10.4 | 34.65 | 3.33 | 31.7 | 42.1 | 18.24 | 1.75 | 52.1 | 67.9 |

TABLE 16

Fabric Tongue Tear and Burst Strength

| Example | CD Tear Max Force (N) | MD Tear Max Force (N) | Bursting Strength (kPa) | Burst Height (mm) |
|---|---|---|---|---|
| A-1 | 9.2 | 7.8 | 28.5 | 31.1 |
| A-2 | 9.3 | 8.0 | 21.8 | 28.5 |
| A-3 | 9.4 | 8.8 | 31.0 | 32.5 |
| A-4 | 9.4 | 9.1 | 31.9 | 30.7 |
| A-5 | 7.8 | 5.8 | 26.9 | 31.8 |

A polymer having an MFR of 16.5 dg/min made using the same procedure as Example 1 (referred to as EX1-A), Achieve™ 3854, and Lumicene™ MR 2002 were formed into fabrics and then tested for various physical properties. The data are reported in Tables 17 and 18. Achieve™ 3854 is a metallocene propylene homopolymer having a MFR of 24 dg/min available from ExxonMobil Chemical Company, Houston, Tex. Lumicene™ MR 2002 is a metallocene propylene homopolymer having a melt flow index (230° C., 2.16 kg ISO 1133) of 15 dg/min and a Tm of 153° C. available from Total Petrochemicals, Feluy, Belgium. The fabrics were formed by the spunbonded nonwoven fabric process and conditions described above at a nominal fabric basis weight of 10 gsm, except that fabrics produced at a line speed of 300 m/min used one spunbond beam.

TABLE 17

Fabric tensile properties per WSP 110.4 (05) at low (300 m/min) and high (900 m/min) spunbond line speed conditions.

| Tensile testing conditions: 100 m/min, 200 mm gauge length | Fabric basis weight (gsm) | CD Strength (N/5 cm/gsm) | MD Strength (N/5 cm/gsm) | CD Peak Elongation (%) | MD Peak Elongation (%) |
|---|---|---|---|---|---|
| PP3155 (300 m/min) | 10.1 | 1.27 | 2.35 | 51. | 42.9 |
| PP3155 (900 m/min) | 10.3 | 0.95 | 2.76 | 59.0 | 44.2 |
| Achieve ™ 3854 (300 m/min) | 10.0 | 1.32 | 3.14 | 45.5 | 40.4 |
| Achieve ™ 3854 (900 m/min) | 9.8 | 0.85 | 2.73 | 39.0 | 24.3 |
| EX1-A(300 m/min) | 10.2 | 1.61 | 2.52 | 56.7 | 45.3 |
| EX1-A(900 m/min) | 9.8 | 1.13 | 2.89 | | 38.4 |
| Lumicene ™ MR 2002 (300 m/min) | 10 | 1.70 | 2.92 | 50.3 | 44.6 |
| Lumicene ™ MR 2002 (900 m/min) | 9.8 | 1.21 | 3.33 | | 37.7 |
| US 2011/0081817 Example 3* | 12.0 | 1.6 | 2.9 | 59 | 65.0 |
| US 2011/0081817 Example 4* | 12.0 | 1.65 | 3.03 | 66 | 68.0 |
| US 2011/0081817 Comparative Example 2* | 12.0 | 1.49 | 2.82 | 57 | 56.0 |
| US 2010/0233927 Example 2* | 12.0 | 1.78 | 3.18 | 69.4 | 66.9 |
| US 2011/0059668 Example 3* | 12.0 | 1.30 | 2.85 | 66 | 61.0 |

*data taken from cited reference, 300 m/min, 12 gsm.

TABLE 18

Fabric Elmendorf tear strength (ASTM D 1922) at low (300 m/min) and high (900 m/min) spunbond line speed conditions, nominal Fabric basis weight 10 gsm

| speed (m/min) | CD Elmendorf Tear (N/gsm) PP3155 | CD Elmendorf Tear (N/gsm) EX1-A | CD Elmendorf Tear (N/gsm) Lumicene MR 2002 | CD Elmendorf Tear (N/gsm) PP3155 | CD Elmendorf Tear (N/gsm) EX1-A | CD Elmendorf Tear (N/gsm) Lumicene MR 2002 | CD Elmendorf Tear (gr/gsm) Achieve 3854 | MD Elmendorf Tear (gr/gsm) Achieve 3854 |
|---|---|---|---|---|---|---|---|---|
| 300 | 11.8 | 15.9 | 20.5 | 7.8 | 11.0 | 14.7 | 19.4 | 13.1 |
| 900 | 12.7 | 13.1 | 16.1 | 7.0 | 9.6 | 11.6 | 16.5 | 12.8 |

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. A propylene polymer composition made with a non-metallocene catalyst comprising at least 90 wt % propylene, said polymer composition having:
    a) a melt flow rate (MFR, ASTM 1238, 230° C., 2.16 kg) of 10 dg/min to 25 dg/min;
    b) a Dimensionless Stress Ratio/Loss Tangent Index $R_2$ at 190° C. from 1.5 to 28.0; and
    c) an average meso run length determined by $^{13}$C NMR of at least 70, or having a percentage molar meso pentads (mmmm) content of greater than 0.935; or a number of stereo defects from 44 to 145 and a number of regio defects from 0 to 80.

2. The propylene polymer composition of claim 1, wherein the composition has a MFR Ratio within a range from 1 to 2.4 and greater than 4.5.

3. The propylene polymer composition of claim 1, where the propylene polymer composition has a Loss Tangent, tan δ, at an angular frequency of 0.1 rad/s at 190° C. from 10 to 100.

4. The propylene polymer composition of claim 1, where the propylene polymer composition has a Dimensionless Stress Ratio Index $R_1$ at 190° C. of 1.2 to 5.0.

5. The propylene polymer composition of claim 1, where the propylene polymer composition has a Dimensionless Shear Thinning Index $R_3$ at 190° C. of 6 to 15.

6. The propylene polymer composition of claim 1, where the propylene polymer composition has a Dimensionless Loss Tangent/Elasticity Index $R_4$ at 190° C. of 1.5 to 25.

7. The propylene polymer composition of claim 1, where the propylene polymer composition has a $T_{mp}$ (second melt, 1° C./min) of 120° C. or more.

8. The propylene polymer composition of claim 1, where the propylene polymer composition has an Mw/Mn within a range from 1.0 to 7.0 and/or an Mz/Mw within a range from 1.5 to 4.5.

9. The propylene polymer composition of claim 1, where the propylene polymer composition has a supercooling parameter SCP (1° C. per minute) of −1° C. or less.

10. The propylene polymer composition of claim 1, having a 1% secant flexural modulus of 190 kpsi or higher.

11. The propylene polymer composition of claim 1, having a heat distortion temperature at 66 psi of 95° C. or higher.

12. The propylene polymer composition of claim 1, where the composition is made with a Ziegler-Natta catalyst.

13. The propylene polymer composition of claim 1, wherein a reactor-grade propylene polymer having an MFR of less than 8.0 or 6.0 or 4.0 or 3.0 g/10 min is visbroken while under shear and/or extensional flow forces and at a melt at a temperature within the range from 190 or 200 or 210° C. to 250 or 260 or 280° C. to form the propylene polymer composition.

14. A propylene polymer composition comprising at least 90 wt % propylene, said polymer composition having:
   a) an MFR in the range from 10 dg/min to 25 dg/min;
   b) an average meso run length determined by $^{13}C$ NMR of at least 90 or higher; or a total number of defects (stereo and regio) per 10,000 monomers of less than 110; or a percentage molar meso pentads (mmmm) content within a range from 0.935 to 0.980;
   or a number of stereo defects from 44 to 145 and a number of regio defects from 0 to 80; and
   c) at least one of the following:
      1) a Dimensionless Stress Ratio Index $R_1$ at 190° C. from 1.2 to 4.5; or
      2) a Dimensionless Stress Ratio/Loss Tangent Index $R_2$ at 190° C. from 1.5 to 28; or
      3) a Dimensionless Shear Thinning Index $R_3$ at 190° C. from 6 to 13; or
      4) a Dimensionless Loss Tangent/Elasticity Index $R_4$ at 190° C. from 1.5 to 20; or
      5) a Loss Tangent (tan δ) at an angular frequency of 0.1 rad/s at 190° C. from 14 to 90; or
   6) a Stress Ratio (SR) at a shear rate of 500 $s^{-1}$ at 190° C. from 3.0 to 6.0.

15. The propylene polymer composition of claim 14, wherein the polymer is made from a Ziegler-Natta catalyst.

16. The propylene polymer composition of claim 14, where the propylene polymer composition has an Mw/Mn within a range from 1.0 to 7.0 and/or an Mz/Mw within a range from 1.5 to 4.5.

17. The propylene polymer composition of claim 14, where the propylene polymer composition has a supercooling parameter SCP (1° C. per minute) of −1° C. or less.

18. The propylene polymer composition of claim 14, having a 1% secant flexural modulus of 190 kpsi or higher.

19. The propylene polymer composition of claim 14, having a heat distortion temperature at 66 psi of 95° C. or higher.

20. A propylene polymer comprising at least 90 wt % propylene, said polymer composition having:
   a) a melt flow rate (MFR, ASTM 1238, 230° C., 2.16 kg) of 10 dg/min to 25 dg/min;
   b) a Dimensionless Stress Ratio/Loss Tangent Index $R_2$ at 190° C. from 1.5 to 28.0; and
   c) an average meso run length determined by $^{13}C$ NMR of at least 70 or higher, or a percentage molar meso pentads (mmmm) content of greater than 0.935, or a number of stereo defects from 44 to 145 and a number of regio defects from 0 to 80;
   d) a melting peak temperature $T_{mp}$ (10° C./min) from 153° C. to 190° C.

21. The propylene polymer composition of claim 16, where the propylene polymer composition has an Mw/Mn within a range from 1.0 to 7.0 and/or an Mz/Mw within a range from 1.5 to 4.5.

22. The propylene polymer composition of claim 16, where the propylene polymer composition has a supercooling parameter SCP (1° C. per minute) of −1° C. or less.

23. The propylene polymer composition of claim 16, having a 1% secant flexural modulus of 190 kpsi or higher.

24. The propylene polymer composition of claim 16, having a heat distortion temperature at 66 psi of 95° C. or higher.

* * * * *